United States Patent [19]
Korcharz et al.

[11] Patent Number: 6,049,471
[45] Date of Patent: *Apr. 11, 2000

[54] CONTROLLER FOR PULSE WIDTH MODULATION CIRCUIT USING AC SINE WAVE FROM DC INPUT SIGNAL

[75] Inventors: Dror Korcharz; Alon Ferentz, both of Bat-Yam, Israel

[73] Assignee: PowerDsine Ltd., Petach Tikva, Israel

[*] Notice: This patent is subject to a terminal disclaimer.

[21] Appl. No.: 09/179,669

[22] Filed: Oct. 27, 1998

Related U.S. Application Data

[63] Continuation-in-part of application No. 09/022,281, Feb. 11, 1998, Pat. No. 5,828,558.

[51] Int. Cl.[7] .................................................. H02M 3/335
[52] U.S. Cl. .................................. 363/20; 363/21; 363/41
[58] Field of Search ................................. 363/15, 16, 17, 363/20, 21, 40, 41, 131, 132, 89, 95, 98; 379/164, 252, 253, 418, 324, 413

[56] References Cited

U.S. PATENT DOCUMENTS

| | | |
|---|---|---|
| 3,739,253 | 6/1973 | Humphery et al. . |
| 4,611,097 | 9/1986 | Grimes . |
| 4,881,014 | 11/1989 | Okochi . |
| 5,068,590 | 11/1991 | Glennon et al. . |
| 5,140,630 | 8/1992 | Fry et al. . |
| 5,216,585 | 6/1993 | Yasumura . |
| 5,260,996 | 11/1993 | Dillon et al. . |
| 5,289,359 | 2/1994 | Ziermann . |
| 5,307,407 | 4/1994 | Wendth et al. . |
| 5,321,596 | 6/1994 | Hurst . |
| 5,473,530 | 12/1995 | Giuseppe . |
| 5,485,365 | 1/1996 | Dan-Harry . |
| 5,570,276 | 10/1996 | Cuk et al. ................................. 363/16 |
| 5,701,243 | 12/1997 | Youn . |
| 5,757,627 | 5/1998 | Faulk ....................................... 363/21 |
| 5,828,558 | 10/1998 | Korcharz et al. . |

OTHER PUBLICATIONS

Horowitz et al., "The Art of Electronics," Three–Terminal and Four–Terminal Regulators, Chapter 6 6.19 Switching Regulators and DC–DC Converters pp. 355–358, no date.

*Primary Examiner*—Adolf Denske Berhane
*Attorney, Agent, or Firm*—Sheldon & Mak; Denton L. Anderson

[57] ABSTRACT

A pulse width modulation (PWM) controller suitable for use with a variety of open loop topology power supply circuits including ring generator circuits. The controller and the circuit realized therefrom utilizes an open loop topology to achieve the desired output voltage waveform. The PWM controller is suitable for realizing a plurality of different open loop converter topologies such as such as buck, boost, forward and push-pull topologies. The PWM controller is adapted to provide the required signals to control the various possible open loop converter topologies. The controller functions to generate a PWM signal that is used to generate a half wave sine wave signal. The controller includes the necessary functionality to control the duty cycle of the generated PWM signal so as to produce a full wave sine wave at the output of the output bridge circuit.

36 Claims, 16 Drawing Sheets

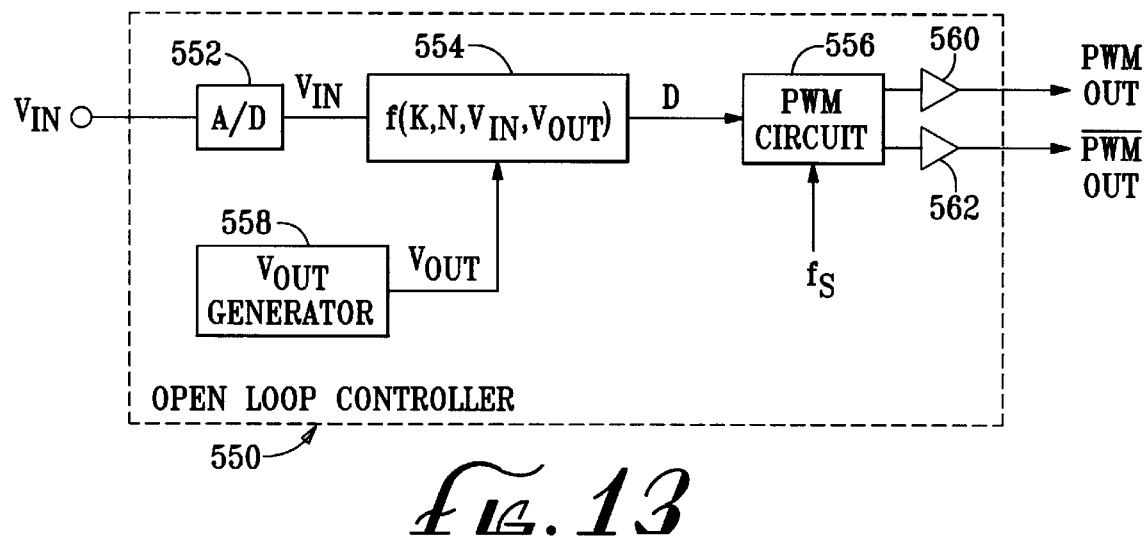
_fig.13_
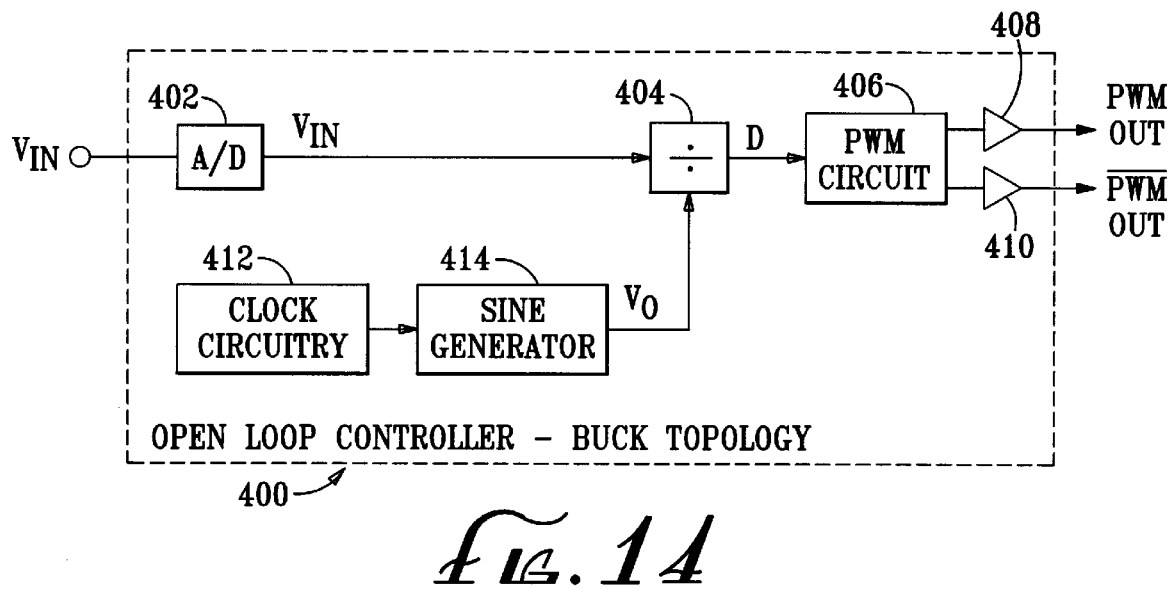
_fig.14_

CONTROLLER FOR PULSE WIDTH MODULATION CIRCUIT USING AC SINE WAVE FROM DC INPUT SIGNAL

RELATED APPLICATIONS

This application is a continuation-in-part of U.S. Patent Application Ser. No. 09/022,281, filed Feb. 11, 1998, now U.S. Pat. No. 5,828,558 which is incorporated herein by reference.

FIELD OF THE INVENTION

The present invention relates generally to PWM controllers and more particularly relates to a PWM controller suitable for use with open loop DC to AC type converters.

BACKGROUND OF THE INVENTION

DC to AC converters such as ring generators are well known devices in common use today for providing the ringing signals used to ring a standard telephone. Telephone service providers employ them to generate the standard ringing tone sent to the telephone(s) installed at the customer's premises. In addition, manufacturers of telephone PBX equipment employ ring generators to provide the ringing signals used to ring the extension telephone sets connected to the PBX equipment.

Typical ring generators are designed to provide sinusoidal or substantially sinusoidal waveforms. Smaller telephone systems, e.g., small loop carrier systems, PBX or key systems, generally make use of electronic ringing techniques as opposed to designs employing large iron core transformers. These smaller systems are typically required to be able to ring a large percentage of the lines simultaneously.

Further, more and more optical fiber is being introduced into the telephone loop plant which the associated increased need for small, reasonably efficient ring generators having well controlled sinusoidal output waveforms. Systems such as fiber to the curb (FTTC) typically serve four residences and may provide up to 12 telephone channels. Fiber to the home (FTTH) systems serve only one residence and typically provide less than three telephone channels. These and other related telephone systems are required to provide a source of ringing which is capable of ringing up to three lines simultaneously. In addition, each line may have as many as five ringers associated with it. The output of the ring generator device must be sufficient to drive each of the ringers on all the supported telephone lines with reasonable efficiency and must maintain a sinusoidal wave shape.

In addition, the ring generator device must be able to be powered from power sources of varying input voltage, such as the commonly found voltages of 5, 12, 24 or 48 Vdc. The power consumption of such a device should be limited so as not to draw excess power and deprive other power supplies in the system of sufficient power to operate satisfactorily. The ring generator device should also be capable of being subjected to overcurrent, i.e., low resistance fault, and short circuit conditions without being sustaining permanent damage. If the device is subjected to an overload due to an excessive number of ringers being rung simultaneously, it must continue to operate and output a sinusoidal waveform, even if it must reduce the output voltage to a point that is not sufficient to ring the excessive ringer load.

SUMMARY OF THE INVENTION

The present invention comprises a pulse width modulation (PWM) controller suitable for use with a variety of open loop topology power supply circuits including ring generator circuits. The controller and the power supply circuit realized therefrom utilizes an open loop topology to achieve the desired output voltage waveform. The PWM controller and associated method is suitable for realizing a plurality of different open loop converter topologies such as such as buck, boost, forward, push-pull and any other continuous mode, PWM controlled topology.

The PWM controller is adapted to provide the required signals to control the various possible open loop converter topologies. The controller functions to generate a PWM signal that is used to generate a half wave sine wave signal. The controller includes the necessary functionality to control the duty cycle of the generated PWM signal so as to produce a full wave sine wave at the output of the output bridge circuit.

The present invention discloses a generalized PWM controller and a plurality of specific converter circuits realized therefrom that utilize an open loop topology. For illustration purposes, the invention is first described within the context of an open loop flyback type ring generator circuit. However, the application of the PWM controller of the present invention is not limited to ring generators but can be adapted to control numerous other types of converters having an open loop topology including, but not limited to, boost, buck, forward and push-pull topologies.

In a first embodiment, the PWM controller provides the required signals to control a ring generator circuit having an open loop fly back topology. The controller functions to generate a PWM signal that is used to switch the primary of a transformer on and off. The controller includes the necessary functionality to control the duty cycle of the generated PWM signal so as to produce a sine wave output on the secondary of the transformer. The controller also includes overcurrent protection circuitry that tracks the power through the output load by sensing the current through the primary winding. In addition, the circuit permits negative current in the secondary by use of a synchronous rectifier circuit coupled to an additional secondary transformer winding. An output bridge circuit creates a full sine wave from the generated half wave output.

The controller functions to implement the well known equation for the transfer function of a flyback transformer circuit in continuous mode as given by $$D = \frac{V_{OUT}}{N \cdot V_{IN} + V_{OUT}}$$

where
$V_{OUT}$=desired output voltage
$V_{IN}$=input voltage
N=turns ratio between the primary and the secondary in the transformer The above equation gives an expression for D the duty cycle of the PWM signal generated by the controller. The values on the right hand side of the equal sign are known, thus the value D can be calculated, thus achieving an open loop configuration. The turns ratio N is determined beforehand and the output voltage $V_{OUT}$ is the desired sine function, which can be generated by any well known means such as a ROM or synchronous state machine. In addition, $V_{IN}$ can be sampled and included in the equation.

The overcurrent protection means in the controller, is operative to sense the current flowing through the primary of the transformer. When the current exceeds a predetermined threshold, an internal up/down counter is incremented increasing the value of a protection constant that the value for the turns ratio N is multiplied by. This causes the output voltage to decrease until the overcurrent condition is eliminated. This is equivalent to increasing the turns ratio, which effectively shortens the duty cycle, which would yield a lower output voltage if it were not for the larger turns ratio.

The primary characteristics of the ring generator controller and the ring generator circuit of the present invention are (1) that the ring generator operates in an open loop topology as opposed to traditional closed loop design, (2) that the circuit generates an AC sine wave from a DC input, (3) that the resultant circuit is relatively simple and inexpensive to manufacture and (4) that the resultant control circuit can be realized in an ASIC.

The circuit can operate with various input voltages $V_{IN}$ such as 5, 12, 24 and 48 Vdc. The amplitude of the generated sine wave output voltage $V_{OUT}$ can vary from 50 to 90 Vrms and is stable despite changes in $V_{IN}$. Further, the output voltage $V_{OUT}$ and can have any of the various frequencies in use by the telecommunication systems around the world including but not limited to 17, 20, 25 and 50 Hz. The circuit also comprises inhibit means with functions to shut down the output and reduce the current consumption of the circuit. The inhibit means comprises an internal synchronization circuit to delay the inhibit action until the output ringing signal reaches the zero level.

Second, third and fourth embodiments present applications of the PWM controller to various well known types of converters such as boost, buck and forward.

BRIEF DESCRIPTION OF THE DRAWINGS

The invention is herein described, by way of example only, with reference to the accompanying drawings, wherein:

FIG. 9 is a graph illustrating the voltage $V_{GS}$ of transistor $Q_1$ and the current $I_1$ during the periods when $Q_1$ is OFF and ON;

FIG. 13 is a block diagram illustrating the general case of the open loop controller of the present invention;

FIG. 14 is a block diagram illustrating a second embodiment of the open loop controller adapted for a converter having a buck topology;

DETAILED DESCRIPTION OF THE INVENTION

Notation Used Throughout

Figure 1:
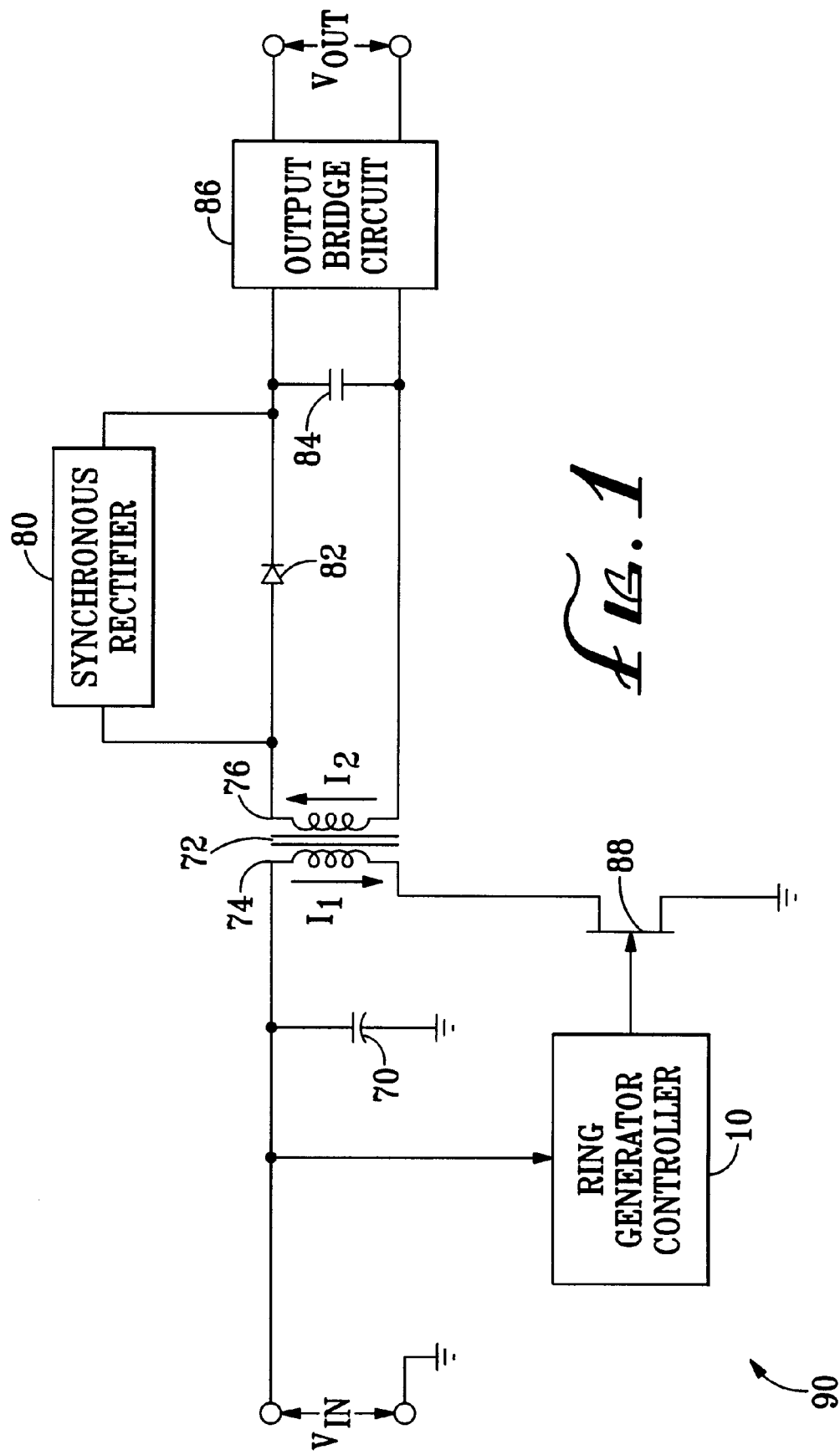
FIG. 1 is a schematic diagram of the first embodiment of a ring generator circuit presented to illustrate the principles of the present invention.

The following notation is used throughout this document.

| Term | Definition |
| --- | --- |
| ASIC | Application Specific Integrated Circuit |
| CTI | Computer Telephony Integration |
| EMF | Electromagnetic Force |
| ESR | Equivalent Series Resistance |
| FET | Field Effect Transistor |
| FTTC | Fiber To The Curb |
| FTTH | Fiber To The Home |
| LED | Light Emitting Diode |
| MOSFET | Metal Oxide Semiconductor Field Effect Transistor |
| PBX | Private Branch Exchange |
| PWM | Pulse Width Modulator |
| RMS | Root Mean Square |
| ROM | Read Only Memory |
| UPS | Uninterruptable Power Supply |
| VSAT | Very Small Aperture Terminal |

General Description

The present invention comprises a PWM controller suitable for realizing a DC to AC converter having an open loop topology. A characteristic feature of the controller is that it provides the necessary circuitry and control signals to generate any desired output voltage without the need to sample the output signal. The controller functions to control the duty cycle of a PWM signal as a function of input voltage, transformer turns ratio and desired output voltage. The controller of the invention is suitable for use with a variety of open loop converter topologies such as buck, boost, forward, push-pull and any other continuous mode, PWM controlled topology.

A detailed description of a controller and an open loop flyback type converter suitable for ring generator applications is provided specific example. Both the controller itself and the ring generator circuit constructed therefrom are presented and described in detail. The ring generator circuit of the type disclosed herein has applications to various communication systems such as PBXs, key systems, facsimile switching, CTI equipment, rural telephony, satellite telephony, VSAT terminal and wireless local loop telephone systems.

The ring generator controller of the present invention has been embodied in an ASIC and is commercially available as Part Nos. PD5019, PD5036 manufactured by PowerDsine Ltd., Petach Tikva, Israel. A family of ring generator circuits, Part Nos. PD22xx, PD21xx and PD23xx, embodying the ring generator controller of the present invention is commercially available as well from the above mentioned company.

General DC Transfer Function

The general DC transfer function of any switching power supply, i.e., DC/DC, AC/DC, AC/AC and DC/AC can be expressed as $$V_O(t) = K \cdot N \cdot V_{IN}(t) f_1(D,t) \cdot f_2(f_S,t) \quad (1)$$

where

K is the topology factor;

N is the transformer turns ratio (N=1 for secondary/primary ratio=1 or for non isolated topologies;

$V_{IN}(t)$ is the input voltage which can be AC or DC; typically it is DC since if the input voltage is AC it is rectified and filtered for low ripple content which simplifies the derivation of $f_1(d,t)$;

$V_O(t)$ is the desired output voltage;

D is the duty cycle of the PWM signal;

$f_S$ is the switching frequency;

The conditions of validity for Equation 1 shown above are (1) the switching frequency $f_S$ is constant and (2) the current through the magnetic element always must be nonzero. In other words, the inductor must operate in a continuous current mode utilizing $$\frac{\Delta I}{2} > \min[I_{AVG}] \quad (2)$$

or synchronous rectification techniques must be used. Under these conditions, the following equation can be used $$V_O(t) = K \cdot N \cdot V_{IN}(t) f_1(D, t) \quad (3)$$

Thus, for any $V_O(t)$, $f_1(D,t)$ can be derived by calculating the following $$f_1(D, t) = \frac{V_O(t)}{K \cdot N \cdot V_{IN}(t)} \quad (4)$$

Examples of applications of the use of Equation 4 include a DC to AC open loop flyback converter that utilizes synchronous rectification to maintain a nonzero current through the magnetic element. Other examples include various open loop DC to AC converters such as buck, boost, forward, push-pull converters and any other continuous mode, PWM controlled open loop topology.

As stated earlier, to aid in understanding the principles of the controller of the present invention, a simplified ring generator circuit is presented in FIG. 1. This simplified ring generator circuit, generally referenced 90, comprises a transformer 72 having a primary winding 74 and a secondary winding 76. The primary is coupled to a ring generator controller, generally referenced 10 and FET 88, capacitor 70. The secondary is coupled to a diode 82, synchronous rectifier 80, capacitor 84 and output bridge circuit 86.

The primary characteristics of the controller and corresponding ring generator circuit of the present invention are (1) that the circuit operates in an open loop topology as opposed to traditional closed loop design, (2) that the circuit is operative to generate an AC sine wave from DC, (3) that the resultant circuit is simple and inexpensive to manufacture and (4) that the resultant control circuit can optionally be realizable in an ASIC.

With reference to FIG. 1, the controller 10 functions to sample the input voltage $V_{IN}$ and to generate the drive signal for switch (FET) 88. It will be appreciated by those skilled in the art that circuit 90 has an open loop flyback topology with no feedback from the output voltage $V_{OUT}$. The controller 10 generates a pulse width modulated (PWM) signal to switch the FET 88 on and off such that a rectified half sine wave is generated at the input to the output bridge circuit 86. The output bridge circuit 86 functions to generate a full output sine wave from the rectified sine wave input thereto.

The circuit can operate with various input voltages $V_{IN}$ including but not limited to 5, 12, 24 and 48 Vdc. The amplitude of the generated sine wave output voltage $V_{OUT}$ can vary from 50 to 90 Vrms with other voltage ranges also possible. In addition, the output voltage can have any of the various frequencies in use by the telecommunication systems around the world including but not limited to 17, 20, 25 and 50 Hz. The circuit also comprises inhibit means with functions to shut down the output and reduce the current consumption of the circuit. The inhibit means comprises an internal synchronization circuit to delay the inhibit action until the output ringing signal reaches the zero level.

The circuit also comprises overcurrent protection means that is activated when the input current exceeds a predetermined threshold. The overcurrent protection means comprises circuitry that limits the input current in order to avoid excessive current being applied to the ringer circuitry and also excessive current being output from the portion of the power generation circuitry that feeds the output bridge circuitry, thus preventing damage to the ring generator circuit. The controller functions to generate the proper peak amplitude in the secondary so as to avoid clipping the peak of the output sine wave. If the overcurrent condition is severe, the protection means will disconnect the ringer within 800 ms and will activate the ring generator after an arbitrary delay, e.g., 5 seconds. During this period, the ringer current consumption is reduced to a low level. When the overload or short circuit is removed, the ringer automatically resumes normal operation after a certain time period.

The operation of circuit 90 will now be described in more detail. As discussed previously, the circuit functions to generate a half sine wave signal, which the output bridge circuit 86 converts into the full sine wave output signal $V_{OUT}$, in open loop fashion with no sampling of the output signal. This is achieved by utilizing the well known transfer function for a flyback circuit. The transfer function of the circuit, in combination with known entities in the circuit, is used to calculate the duty cycle of the switching signal applied to the switch 88. The transfer (or transmission) function relates the output voltage as a function of the duty cycle, input voltage and the ratio of the primary winding and the secondary winding, and is expressed below in Equation 5

$$\frac{V_{OUT}}{V_{IN}} = N \cdot \frac{D}{1-D} \tag{5}$$

where $$N = \frac{N_2}{N_1} \tag{6}$$

and $V_{OUT}$=half sine wave output voltage
$V_{IN}$=input voltage
N=turns ratio
$N_1$=number of turns on the primary winding
$N_2$=number of turns on the secondary winding
D=duty cycle of the PWM signal input to the switch Thus, the output voltage $V_{OUT}$ can be expressed as $$V_{OUT} = V_{IN} \cdot N \cdot \frac{D}{1-D} \tag{7}$$

It is important to note that the above equation for the transfer function is valid only when the current through the transformer 72 is continuous. Thus, during each and every cycle of the circuit, a loop of current must flow either in the primary winding 74 or the secondary winding 76, thus maintaining a flow of current through the transformer 72.

Considering the above transfer function, all the entities with the exception of the duty cycle can be determined beforehand. The output voltage $V_{OUT}$ is a known entity, even though it is the voltage that the circuit is generating. The input voltage $V_{IN}$ is also known as it can be periodically sampled. Further, the turns ratio N can be predetermined and thus known for a particular application. The only entity not known or predetermined is the duty cycle D that must be calculated each cycle. Thus, solving the above equation for D yields $$D = \frac{V_{OUT}}{N \cdot V_{IN} + V_{OUT}} \tag{8}$$

Thus, the controller 10, functions to calculate during each cycle, the duty cycle D which is used to adjust accordingly, the pulse width of the switching signal applied to the gate of the FET 88.

As previously stated, the above equation is only valid if the current through the transformer 72 is continuous. The current through both the primary 74 and the secondary 76 is determined, among other things, by the switching signal applied to the switch 88, by the circuitry coupled to the secondary and by the load (if any) placed either at the input to the output bridge circuit 86 or at the output.

Figure 2A:
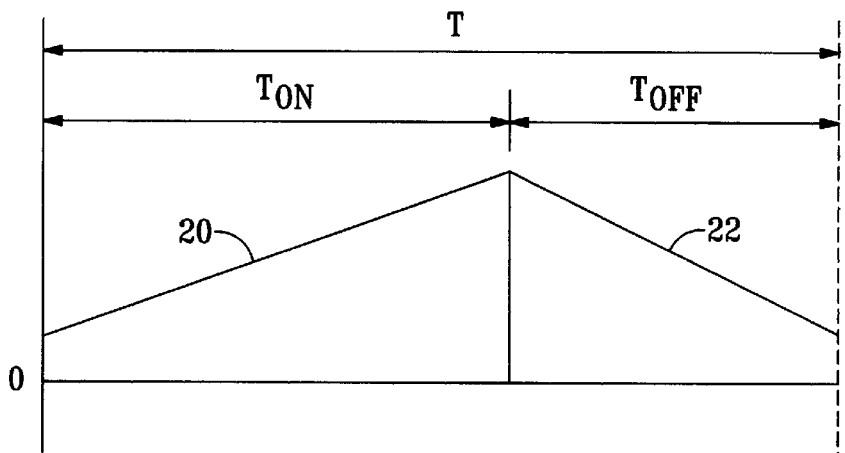
FIG. 2A is a graph illustrating the current through the primary and the secondary winding of the transformer when operating in continuous mode.

Continuous current through the transformer can be achieved by one of two methods. The first is to place a minimum load in the secondary circuit and the second is to use what is known as a synchronous rectifier or synchronous diode circuit. A graph illustrating the current through the primary and the secondary winding of the transformer when a load is placed in the secondary is shown in FIG. 2A. The current through the transformer 72 is shown for one cycle of the circuit having a period T. The time period $T_{ON}$ represents the time the switch 88 is on and $T_{OFF}$ represents the time the switch is off. The controller 10 fuictions to generate a PWM signal to drive switch 88 having a duty cycle that is determined in accordance with the above described equation.

Curve 20 depicts the current $I_1$ flowing through the primary when the switch 88 is on and curve 22 depicts the current $I_2$ flowing though secondary when the switch is off. The current traces in FIG. 2A represent the case when continuous current through the transformer is achieved by placing a minimum bleeder load in the secondary circuit. As can be seen, the load creates a DC level that is wasteful of energy and makes the circuit inefficient. As the bleeder load increases, the DC level increases which makes the circuit even more inefficient.

Figure 2B:
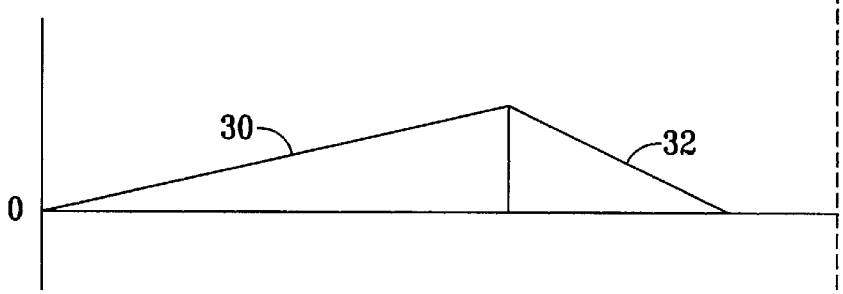
FIG. 2B is a graph illustrating the current through the primary and the secondary winding of the transformer when operating with no load and exhibiting an interruption in current flow, i.e., non continuous mode.

A graph illustrating the current through the primary and the secondary winding of the transformer when operating with no bleeder or other type of load is shown in FIG. 2B. Curve 30 depicts the current $I_1$ flowing through the primary when the switch 88 is on and curve 32 depicts the current $I_2$ flowing though secondary when the switch is off. These current curves represent the case where no synchronous diode or bleeder load is utilized in the circuit. Thus, with reference to FIG. 1, the secondary only comprises diode 82 and capacitor 84. In this case, there is no path for the current to flow back to the primary when the back EMF is created during the period the switch 88 is off There is no mechanism for the voltage on the capacitor 84 to discharge because diode 82 is reverse biased. Since there is no load in the secondary, the current through the secondary falls to zero and the voltage on the capacitor creeps higher and higher, destroying the sine wave shape of the output. At this point, the voltage on the capacitor does not follow the transfer function.

Figure 2C:
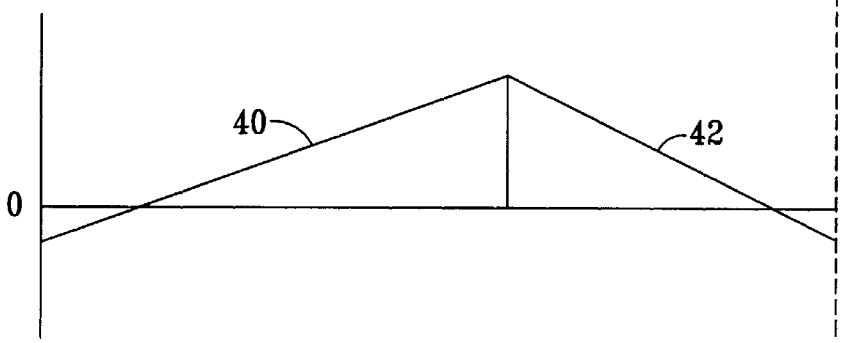
FIG. 2C is a graph illustrating the current through the primary and the secondary winding of the transformer when operating with a synchronous rectifier in the secondary.

A graph illustrating the current through the primary and the secondary winding of the transformer when operating at a high efficiency with a synchronous rectifier in the secondary is shown in FIG. 2C. Curve 40 depicts the current $I_1$ flowing through the primary when the switch 88 is on and curve 42 depicts the current $I_2$ flowing though secondary when the switch is off. In this case, the synchronous diode 80 is placed in the secondary and functions to give back energy to the primary during the time the switch 88 is off During the time the switch is on, the current $I_1$ in the primary steadily increases until the switch turns off. When the switch turns off, the current $I_2$ steadily decreases in the secondary. At some point, the current decreases to below zero where it changes direction. It is at this point when the current flow changes direction, that the synchronous diode circuit kicks in to maintain the flow of current in the secondary. Note that without a synchronous diode 80, the diode in the secondary of the flyback transformer does not permit a negative current to flow. When current cannot flow through the diode, the transmission function is not valid anymore and the output loses its sine wave shape.

Figure 3:
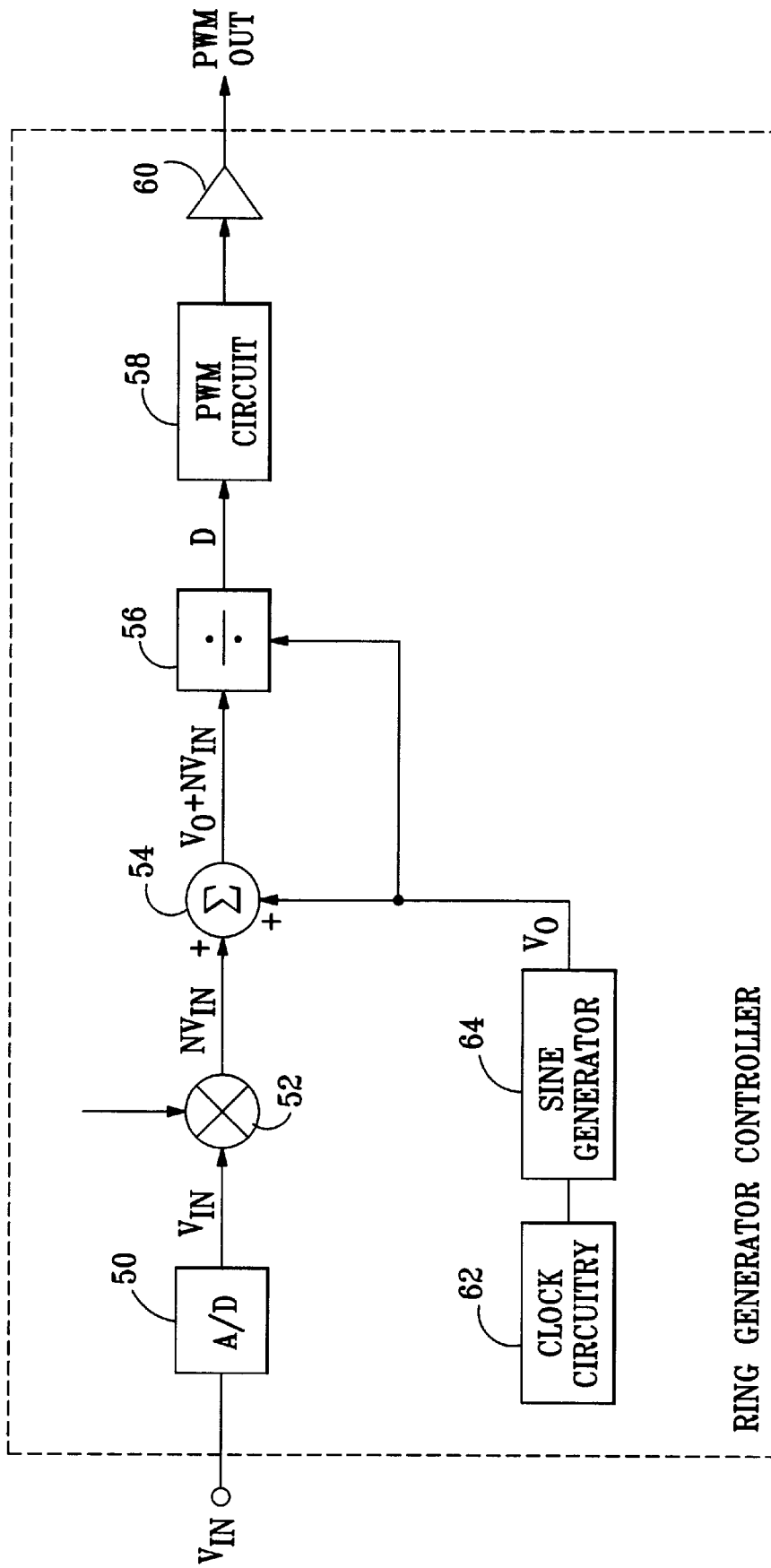
FIG. 3 is a block diagram illustrating a first embodiment of the open loop controller of the present invention.

The controller suitable for controlling an open loop flyback ring generator circuit will now be described in more detail. A block diagram illustrating a first embodiment of the open loop controller of the present invention is shown in FIG. 3. With reference to FIG. 1, the ring generator controller 10 comprises the necessary elements to realize the following equation as presented hereinabove in Equation 8.

$$D = \frac{V_{OUT}}{N \cdot V_{IN} + V_{OUT}} \quad (8)$$

Each of the entities on the right side of the equation are known. The input voltage $V_{IN}$ is sampled and input to the controller as shown in FIG. 1. In addition, the turns ratio N is known and available to the controller. The remaining entity, the output voltage $V_{OUT}$ is also known, since it the voltage that is desired to be generated at the output.

With reference to FIG. 3, the controller 10 comprises an A/D converter 50, multiplier 52, adder 54, divider 56, PWM circuit 58, output buffer 60, clock circuitry 62 and sine generator 64. The input voltage $V_{IN}$ is input to the A/D converter 50 that output a voltage representative of $V_{IN}$. The output of the A/D converter is input to one of the two inputs of multiplier 52. The turns ratio N is input to the second input of the multiplier. The multiplier outputs the product $N \cdot V_{IN}$ that is input to one of the two input of the adder 54.

Clock circuitry generates the necessary clock signals to drive sine generator 64 which can comprise a read only memory (ROM) containing a digitally sampled sine function. Note that only 90 degrees of sine function data is required. The output of the sine generator represents the output voltage $V_{OUT}$. This is then input to the second input of adder 54. The adder generates the sum $N \cdot V_{IN} + V_{OUT}$ that is input to one of the two inputs of divider 56. The second input to the divider is the $V_{OUT}$ from the sine generator. The divider generates the dividend D as shown in the equation above.

The duty cycle value D is input to a conventional pulse width modulation (PWM) circuit 58 which functions to generate a square wave output signal having a duty cycle D. The output of the PWM circuit is input to the buffer 60 that generates a signal able to drive the switch 88.

Figure 4:
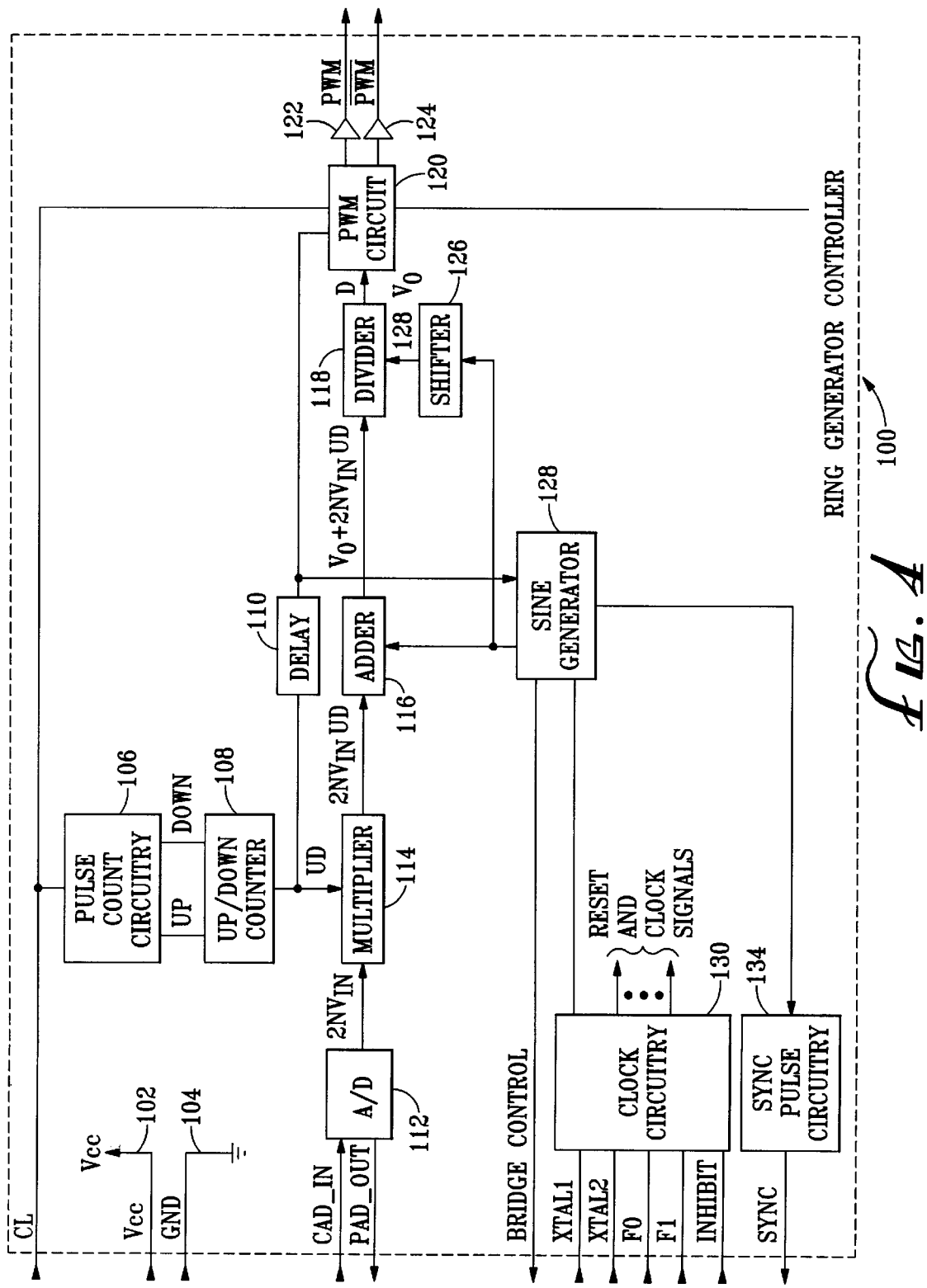
FIG. 4 is a block diagram illustrating the first embodiment of the open loop controller of the present invention in more detail.

It is apparent to those skilled in the electrical arts that the controller of FIG. 3 can be realized in many different ways as long as the equation for the duty cycle D is implemented. To better illustrate application of the controller of the present invention, an example ring generator controller is presented which realizes the above equation for the duty cycle D. A block diagram illustrating an example ring generator controller circuit in more detail is shown in FIG. 4.

The ring generator controller, generally referenced 100, implements the equation for the duty cycle D as described in detail in connection with FIG. 3. The ring generator circuit 100 of FIG. 4 implements the equation for the duty cycle D utilizing an A/D converter 112, multiplier 114, adder 116, divider 118, shifter 126, sine generator 128 and PWM circuit 120. In addition, the controller 100 comprises a pulse count circuit 106, up/down counter 108, clock circuitry 130, sync pulse circuitry 134 and buffers 122, 124. Power is supplied to the circuit via $V_{CC}$ 102 supplied from an external source. A ground 104 connects the circuit to a ground reference potential.

The clock circuitry 130 comprises standard circuitry for generating the various clock and reset signals used throughout the controller 100. In particular, the clock circuitry has two inputs $XTAL_1$, $XTAL_2$ to which a clock drive source is to be connected. For example, the clock drive source can have a frequency of between 10 to 20 MHz. The clock circuit is adapted to receive a simple RC oscillator, crystal oscillator, ceramic resonator, LC or external clock drive source. The clock circuit also comprises frequency divider circuitry to divide the clock into smaller frequencies. The two inputs F0, F1 can be used to determine the frequency of the sine wave output signal $V_{OUT}$. The INHIBIT input functions to shut down the output signal from the PWM circuit 120. This reduces the current consumption of the controller and associated circuitry. The clock circuitry comprises internal synchronization circuitry that delays the inhibit action until the output sine wave signal level crosses the zero level. Note that the INHIBIT input can be used to generate the ringing signal's on/off intervals.

The A/D converter 112 functions to sample the input voltage $V_{IN}$. A signal called CAD_IN is input to the converter and a signal called PAD_OUT is output from the converter. The A/D converter and related circuitry is adapted, in this example, to generate an 8 bit output that already has the turns ratio N factored into the output. In addition, the value output by the A/D converter is twice the product of the turns ratio times the input voltage, i.e., $2 \cdot N \cdot V_{IN}$. The operation of the A/D converter and the method of sampling the input voltage is described in more detail hereinbelow in connection with FIG. 11.

The output of the A/D converter is input to one of the two input of the multiplier 114. The second input is the output of up/down counter 108. The up/down counter 108 in combination with pulse count circuitry 106 and an external comparator comprise the overcurrent protection means for the ring generator circuit. The principle of the overcurrent protection mean is to increase the value of the $N \cdot V_{IN}$ term in the equation for D given above. Increasing the $N \cdot V_{IN}$ term forces the equation to yield a lower value for D. As $N \cdot V_{IN}$ increases, the duty cycle calculated decreases, thus lowering the output voltage that, in turn, reduces the current flow through the load.

The pulse count circuitry 106 receives a signal called CL which is a signal comprising of pulses indicating whether the current through the load is less than or greater than the maximum permissible current. The pulse count circuitry 106 is a 10 bit counter which functions to count the number of CL pulses received during each half cycle of the output sine wave. The frequency of the CL pulses may be as high as 300 KHz. The higher the count number, the higher the overload or overcurrent condition in the circuit. The count circuitry receives the clock and reset signals from the clock circuitry 130 required to perform the counting function on a half cycle basis. The counter is reset at a rate of approximately 34 to 100 Hz.

Figure 5:
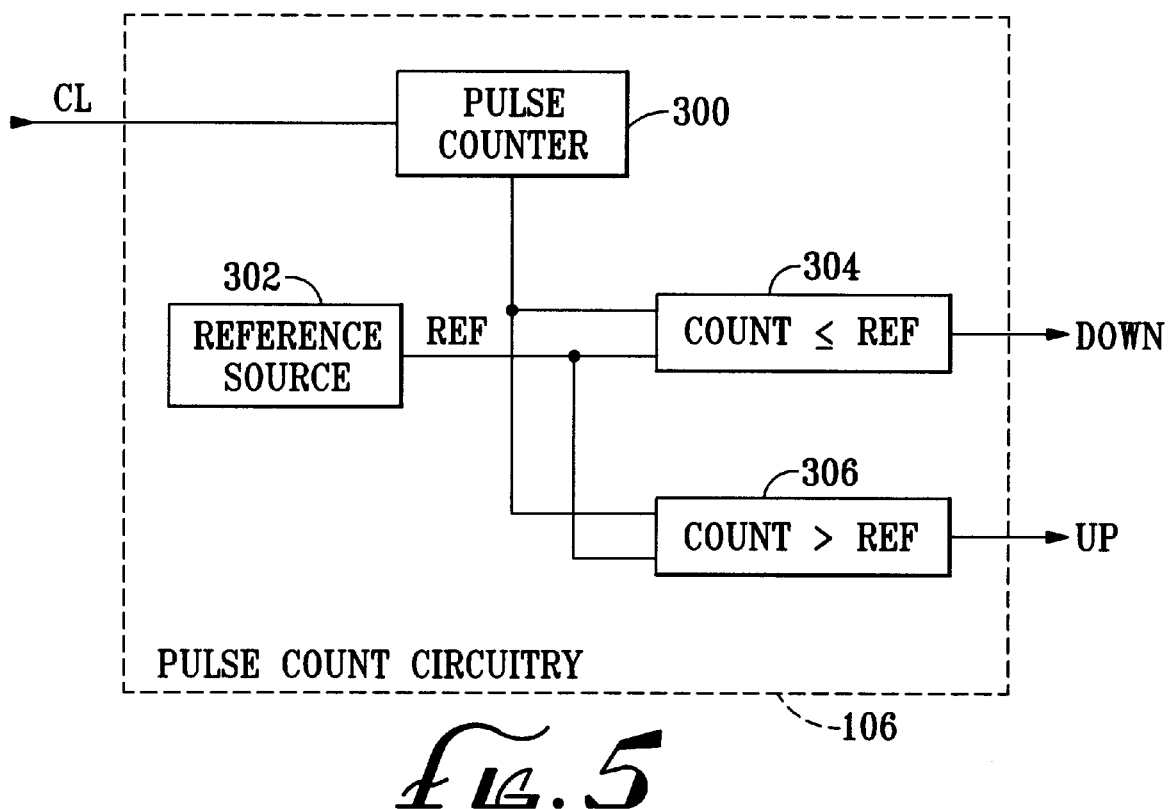
FIG. 5 is a block diagram illustrating the pulse count circuitry in more detail.

A block diagram illustrating the pulse count circuitry in more detail is shown in FIG. 5. The pulse count circuitry 106 comprises a 10 bit pulse counter 300 adapted to receives the CL signal, reference source 302 and comparators 304, 306. The pulse count circuitry is adapted to generate UP and DOWN signals based on the reference source 302 and the value of the pulse counter 300. Logic circuits 304, 306 compare the value of the reference source 302 with the value of the pulse counter 300. Logic block 304 comprises logic circuit means for determining whether the pulse counter is less than or equal to the reference source value. If it is, the DOWN signal is asserted. Similarly, logic block 306 comprises logic circuit means for determining whether the pulse counter is greater than the reference source value. If it is, the UP signal is asserted. Although not shown, the two signal F0, F1, input to the clock circuitry 130 (FIG. 4) are utilized by the pulse count circuitry 106 in determining the reference source value. Values of F0, F1 corresponding to higher frequency output sine wave signals, correspond to lower values of the reference source 302.

The UP and DOWN signals output by the pulse count circuitry 106 and input to up/down counter 108 are generated once for each half cycle of the sine wave output. The up/down counter 108 is a 5 bit counter that is adapted to count within the range 16 to 31. Once the counter 108 reaches a value of 16, additional DOWN pulses do not effect the count. Likewise, once the counter reaches a value of 31, additional UP pulses do not effect the count. If neither of the UP or DOWN signals are active, the count is not effected. In general, when no overcurrent condition exists, the value of the up/down counter is 16.

The output signal UD of counter 108 is input to the delay circuit 110 and the second input of the multiplier 114. The multiplier is adapted to multiply its two inputs together to yield the following 8 bit value $$2 \cdot N \cdot V_{IN} \cdot \frac{UD}{32} \qquad (9)$$

when no overcurrent condition exists, the terms '2' and $$\frac{UD}{32}$$

cancel each other out leaving only $N \cdot V_{IN}$. When an overcurrent condition does exist, the output of the multiplier will be higher than $N \cdot V_{IN}$ but less than $2 \cdot N \cdot V_{IN}$. Note that the signal UD can easily be divided by 32 by a right shift of 5 bits.

The output of the multiplier 114 is input to one of the two inputs of adder 116. The second input to the adder comprises the output of the sine generator 128. The sine generator functions to generate a 7 bit digital representation called $V_O$ of the output signal. The generator 128 receives a clock input from the clock circuitry 130. The generator 128 may be implemented in numerous ways well known in the art. For example, a combination address counter/ROM look up table containing the sine function samples can be used to generate the sine output. Alternatively, a synchronous state machine can be used that is adapted to generate the required sine function samples. The sum generated by the adder can be expressed as the following $$V_O + 2 \cdot N \cdot V_{IN} \cdot \frac{UD}{32} \qquad (10)$$

The output of the adder 116 is input to one of two inputs of divider 118. The second input is the output of a shifter 126. The input to the shifter is the output $V_O$ of the sine generator 128. The shifter 126 functions to shift the sine output $V_O$ 7 bits to the left, i.e., $V_O$ is multiplied by 128. This is done in preparation for the divide. The output of the divider is a 7 bit number D in the range 0 through 127 that is representative of the duty cycle. The output of the divider is given by $$\frac{128 \cdot V_O}{V_O + 2 \cdot N \cdot V_{IN} \cdot \frac{UD}{32}} \qquad (11)$$

The output D of the divider 118 is input to the pulse width modulation (PWM circuit 120. The PWM circuit is a standard circuit that converts the input that is within the range 0 through 127 to a square wave having a duty cycle in accordance thereto. The duty cycle that can range between 0 and 1 expressed as a percentage (0 to 100%) is given as $$\text{Duty Cycle Expressed As Percentage} = \frac{D}{128} \times 100\% \qquad (12)$$

The PWM circuit 120 functions to generate two output signals, a PWM signal and its inverse $\overline{PWM}$. These two signals are input to buffers 122, 124, respectively to generate buffered signals. The buffers 122, 124 generate PWM signals that are suitable for driving an external transistor or circuit that is connected to the controller 100.

In addition to the pulse count circuit 106, the PWM circuit 120 also receives the CL signal input. Receipt of the CL signal, which indicates an overcurrent condition in the ringer circuit, causes the PWM unit to immediately terminate the current pulse width cycle. Thus, if the PWM signal is high at the time the CL signal is received, it is immediately brought low effectively terminating the current cycle.

The delay circuit 110 operates with the pulse count circuitry 106 and up/down counter 108 to provide overcurrent protection for the ringer circuit. The output UD of the up/down counter 108 is input to the delay circuit 110. When the value of UD reaches 31, its maximum, the delay circuit triggers a timer having a predetermined maximum, e.g., 300 mS. If the output UD of the up/down counter remains 31 for the full duration of the 300 ms count, the PWM_OFF signal is generated.

The PWM_OFF signal is input to the PWM circuit 120 and the sine generator 128. When received by the PWM circuit, the PWM_OFF signal causes the PWM to shut off completely thus reducing the duty cycle to 0. When received by the sine generator, the PWM_OFF signal causes the sine generator to shut down also, i.e., the value $V_O$ output by the sine generator is reduced to zero after the current cycle is completed.

After the PWM_OFF signal is generated, the delay circuit triggers a second timer, this one set for a much longer period, e.g., 5 seconds. After waiting the period of the second timer, i.e., 5 seconds, the PWM_OFF signal is de-asserted and the sine generator is reset to start generating the sine from the 0 degree point. In addition, the PWM circuit is turned back on. Since the contents of the up/down counter are not effected, the first timer of 300 ms can be immediately trigger again with the subsequent assertion of the PWM_OFF signal after 300 ms providing the count remains at 31 for the duration. In this fashion, the delay circuit can trigger the PWM_OFF signal over and over as long as the overcurrent/overload condition exists.

In addition to generating the sine function values, the sine generator 128 functions to generate a bridge control signal used by the output bridge circuit (described hereinbelow) to convert the rectified sine to a full positive and negative sine wave.

The sync pulse circuitry 134 receives an output from the sine generator 128 and the necessary clock signals from the clock circuitry 130 to generate an output signal that comprises a series of pulses representing the zero crossings of the sine wave output. Pulses are generated for both positive and negative zero crossing transitions. This circuit can be used, for example, by external telecommunication equipment to perform other related telecom functions.

Figure 6:
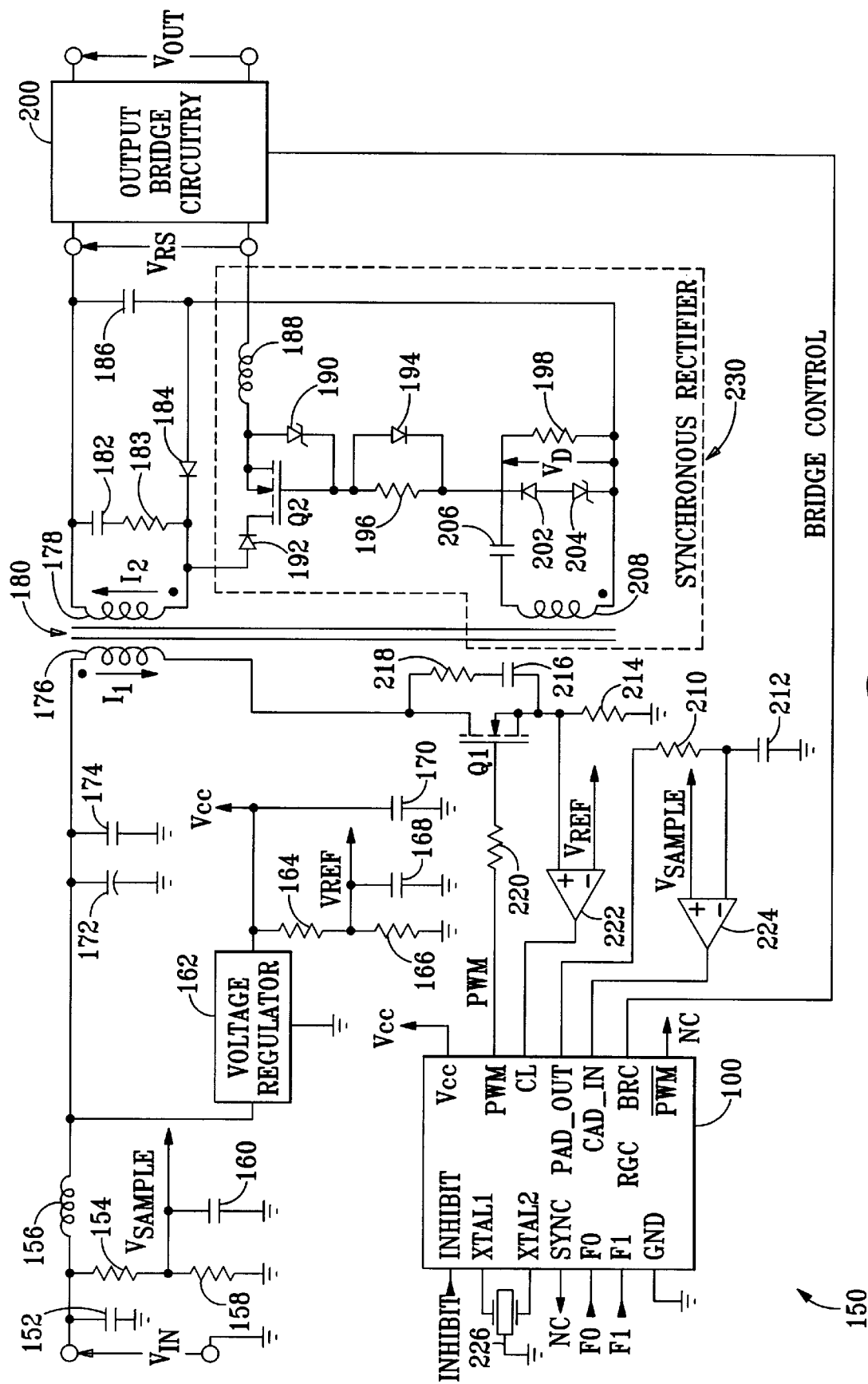
FIG. 6 is a schematic diagram illustrating a first embodiment of a ring generator circuit constructed in accordance with an embodiment of the present invention.

An example ring generator circuit constructed utilizing the controller 100 of FIG. 4 will now be described in more detail. A schematic diagram illustrating a ring generator circuit constructed in accordance with an embodiment of the present invention is shown in FIG. 6. The ring generator circuit, generally referenced 150, is constructed around the ring generator controller 100 of FIG. 4. The circuit 150 is generally of the form as shown as described in connection with FIG. 1.

In general, the controller 100 generates the PWM switching signal which is used to switch a transistor on and off. During the on period, current flows through the primary winding of the transformer. When the transistor switches off, current flow is induced in the secondary of the transformer. The rectified sine wave voltage is converted into a sine wave by an output bridge circuit.

The input voltage $V_{IN}$ is filtered by a capacitor 152 and inductor or ferrite bead 156. The input voltage is applied to a voltage divider comprising resistors 154, 158. The output of the divider, denoted by $V_{SAMPLE}$, is smoothed by capacitor 160. The sampled input voltage is input to the plus input of a comparator 224. The sampled voltage $V_{SAMPLE}$ is used to derive the input to the A/D converter 112 (FIG. 4) in the controller 100. The output of the comparator forms the input CAD_IN to the A/D converter. The operation of this circuit is described in more detail hereinbelow.

The output of the ferrite bead 156 is input to a voltage regulator 162 which may comprise the LM7805, a 5 V voltage regulator IC manufactured by National Semiconductor or any other suitable voltage regulator. The output of the regulator 162 forms the $V_{CC}$ for the ringer circuit and the controller 100 and is filtered by capacitor 170 that preferably has a value of 0.33 µF. The output of the regulator is also input to a voltage divider comprising resistors 164, 166. The output of the divider, denoted by $V_{REF}$, is filtered by a capacitor 168 that preferably has a value of 10 nF. The voltage $V_{REF}$ is input to the plus input of comparator 222. The comparator functions to generate the CL pulses input to the controller 100 that serve to indicate an overcurrent condition at the output of the ringer.

The output of the ferrite bead 156 is also filtered by capacitors 172, 174. Capacitor 172 may comprise an aluminum electrolytic capacitor having a value or 47 µF and capacitor 174 may comprise a high frequency, low ESR capacitor having a value of 1 µF. The input voltage is then applied to the primary winding 176 of transformer 180. Transformer 180 comprises a single primary winding and two secondary windings 178, 208. Secondary winding 178 is used to transfer energy from the primary for producing the output of the ringer. Secondary winding 208 is used in the operation of the synchronous rectifier or diode that is described in more detail hereinbelow. The primary winding 176 having $N_1$ turns, the secondary winding 178 having $N_2$ turns and the turns ratio N given by $$\frac{N_2}{N_1}.$$

The INHIBIT input to the controller 100 is provided by an external source. As described previously, the INHIBIT input controls the output of the ringer PWM circuit. A clock drive source 226 such as a ceramic resonator or crystal is connected to the $XTAL_1$, $XTAL_2$ inputs of the controller 100. Clock drive source 226 provides the clock drive for the clock circuitry 130 (FIG. 4) portion of the controller 100. The two frequency selection inputs F0, F1 determine the frequency of the sine wave output by the ringer, as described in more hereinabove. The $V_{CC}$ input is connected to the $V_{CC}$ line and GND is connected to ground potential. The example circuit of FIG. 6 does not utilize the SYNC signal or the $\overline{PWM}$ signal generated by the controller.

The bridge control signal is output from the BRC output of the controller and connected to the output bridge circuitry 200. The PAD_OUT and CAD_IN signals in combination with the A/D converter circuitry are described in more detail below in connection with FIG. 11.

The primary circuit is switched on and off by a switch $Q_1$ which may comprise any suitable transistor such as the n-channel enhancement mode MOSFET shown in FIG. 6. An n-channel logic level type of transistor is well suited in this particular example assuming the controller outputs a 5 V logic level switching signal. One skilled in the art will recognize that other types of transistors can be used in situations where the voltages are other than 5 V, e.g., 12 V.

A resistor 218 and capacitor 216 are connected between the source and the drain of the transistor $Q_1$. The resistor 218 and capacitor 216 form a snubber circuit that functions to greatly reduce the voltage spikes that would normally appear on the drain terminal of transistor $Q_1$. The large voltage spikes caused by the back EMF generated by the distributed inductance in the primary winding circuitry and by the inherent diode formed between the drain and the source of the transistor $Q_1$. A suitable value for the resistor 218 is 62 ohms and for the capacitor 216 is 330 pF.

The source of transistor $Q_1$ is connected to resistor 214 that functions to develop a voltage proportional to the current flowing through the primary 176. This current is proportional to the power input to the ringer circuit that, in turn, is proportional to the power transferred to the load. Thus, the voltage developed across resistor 214 is proportional to the ringer input power and to the load power and can be used to detect whether an overload condition exists. A suitable value for resistor 214 is approximately 0.1 ohms.

The voltage developed across the resistor 214 is input to the minus input of comparator 222. When the current is below the reference threshold, the output of the comparator remains high. The output of the comparator 222 will switch to a low level whenever the current flowing through the primary exceeds a predetermined threshold. This threshold is determined by the combination of the value of $V_{REF}$ and the value of resistor 214. As described above, pulses on the CL input of the controller 100 cause the PWM circuit to lower the duty cycle of the PWM output signal. This, in turn, is intended to lower the output voltage and thus, the load current. This is reflected back to the primary and reduces the current flowing through the transistor $Q_1$. This causes the voltage across resistor 214 to decrease and eventually, the output of the comparator 222 will go high. Thus, in the event of an overcurrent condition, a series of pulses on the CL input line are generated which are effective to lower the load current and reduce or eliminate the overcurrent condition.

Assuming a value of 0.1 ohms for resistor 214, the circuit 150 is adapted such that when the current through the primary exceeds approximately 2 A, a CL pulse will be generated. This requires a reference voltage $V_{REF}$ of 0.2 V to be supplied to the plus input of comparator 222. The threshold for generating the CL pulses can be adjusted by changing the value of the resistor 214 and the value of the reference voltage $V_{REF}$.

A resistor 183 in series with a capacitor 182 is connected in parallel across the secondary 178 of the transformer 180. Resistor 183 and capacitor 182 function as a snubber to reduce the high voltage spikes generated in the secondary circuit from the back EMF generated when $Q_1$ turns off. Suitable values for the resistor 183 and the capacitor 182 are 390 ohm and 220 pF, respectfully.

The secondary circuit also comprises a diode 184 and capacitor 186. When $Q_1$ is on, diode 184 prevents current from flowing. When $Q_1$ turns off, current flows through diode 184 in the positive $I_2$ direction and charges capacitor 186, thus generating a positive voltage $V_{RS}$ across the capacitor 186. Note that without the diode 184, the capacitor would discharge when $Q_1$ turns on again and current flows through the primary. During operation, voltages in excess of 100 V may be generated across the capacitor 186. A suitable value for capacitor 186 is 0.22 $\mu$F.

The operation of the synchronous rectifier circuit, generally referenced 230, will now be described in more detail. The synchronous rectifier 230 is located on the secondary of the transformer 180 and comprises diodes 192, 194, 202, switch $Q_2$, inductor or ferrite bead 188, zener diodes 190, 204, resistors 196, 198, capacitor 206 and secondary winding 208. Switch $Q_2$ is preferably a transistor such as an n-channel enhancement MOSFET. Zener diode 190 preferably has a threshold voltage of 15 V and zener diode 204 preferably has a threshold voltage of 5.1 V. The value of resistors 196, 198 is preferably 1K and 10K ohms, respectively. Note that the inductance of the primary winding 176 is denoted by $L_1$, the inductance of the secondary winding 178 denoted by $L_2$ and the inductance of secondary winding 208 denoted by $L_3$.

When transistor $Q_1$ is on, i.e., $R_{DS} \approx 0$, the current $I_1$ in the primary winding 176 flows through $L_1$ in accordance with the following equation $$\Delta I_1 = \frac{V_{IN}}{L_1} \cdot \Delta t \tag{13}$$

The current in the secondary winding 178 (which is wound in the opposite direction as indicated by the dots in FIG. 6) would be minus $I_2$, but the diode 184 and the synchronous rectifier 230 do not permit current to flow. Thus, the current $I_2$ is zero.

When transistor $Q_1$ shuts off, i.e., $R_{DS} \to \infty$, the current $I_1$ is zero. The voltage on the secondary is reversed due to the back EMF and the current $I_2$ flows through diode 184 and charges capacitor 186. The current flow $I_2$ immediately begins to decrease in a linear fashion according to $$\frac{\Delta I}{\Delta t} \tag{14}$$

When the current through the loop comprising the secondary winding 178, capacitor 186 and diode 184 reaches zero, the diode becomes reverse biased and thus does not permit negative $I_2$ current to flow. It is at this point that the synchronous diode begins to conduct, permitting current to flow from the capacitor 186 to the secondary winding 178. In other words, the capacitor functions as a voltage source that charges the transformer 180.

An illustrative example will now be presented to highlight the operation of the synchronous rectifier 230. For purposes of the example it is assumed that $V_{IN}$ is approximately 12 V, the turns ratio N1:N2 is 1:4 and the turns ratio N1:N3 is approximately 1:1, where N1, N2, N3 are the number of turns for windings 176, 178, 208, respectively.

When transistor $Q_1$ is on, i.e., $R_{DS} \approx 0$, current $I_1$ flows in the primary winding 176. The current $I_2$ in the secondary 178 is zero since diode 184 is reverse biased. Current does flow, however, through the secondary winding 208. The inductance $L_3$ creates a current loop through zener diode 204, diode 202 and capacitor 206. Due to the turns ratio of 1:1, 12 V is generated across the secondary 208. Thus, there is a drop of 5.1 V across the zener diode, 0.7 V across the diode 202 yielding 6.2 V across the capacitor 206. The voltage $V_D$ is equal to -5.8 V. For there to be a sufficient voltage $V_{GS}$ to turn on transistor $Q_2$, $V_{GS}$ must exceed the positive threshold voltage of transistor $Q_2$. The zener diode 190 can optionally be used to limit $V_{GS}$ to a safe value. In this case, the voltage $V_D$ across the series diodes 202, 204 is -5.8 V and thus transistor $Q_2$ is off and the current $I_2$ is zero.

The moment transistor $Q_1$ turns off, the voltages across secondary windings 178, 208 reverse directions due to the back EMF generated. Assuming that the output voltage is approximately 100 V, the voltage $VL_1$ generated across the primary winding 176 equals the voltage $VL_3$ generated across the secondary winding 208 and is given by $$V_{L1} = V_{L3} = \frac{1}{4} \cdot 100 \tag{15}$$

$$= 25 \, V$$

Therefore, the voltage $V_D$ is now 25+6.2=31.2 V. There is now sufficient potential to exceed the threshold voltage of transistor Q2 that is protected by zener diode 190. Once Q2 turns on, current begins to flow through resistor 196, zener diode 190, ferrite bead 188, zener diode 204 and diode 202. The voltage $V_{GS}$ on the gate of transistor $Q_2$ is 15 V, thus $Q_2$ is on and current is permitted to flow is both positive and negative directions. Note, however, that in actuality, current through transistor $Q_2$ only flows in the negative $I_2$ direction due to diode 192. Thus, current flows through the synchronous rectifier 230 only for negative $I_2$ current.

When the next cycle begins, transistor $Q_1$ turns on and the voltage $VL_3$ across the secondary winding 208 becomes 12 V again. This causes a rapid discharge of charge from the gate of transistor $Q_2$ through diode 194 permitting it to quickly turn off. Resistor 196 functions to soak up excess voltage supplied to the gate of $Q_2$. Note that the ferrite bead 188 functions to limit the current spike that is generated when transistor $Q_1$ turns on and $Q_2$ did not yet turn off, e.g., the first 100 nanoseconds. During this time it appears as a short. Optionally the $\overline{PWM}$ signal can be used to turn $Q_2$ off before $Q_1$ turns on.

To aid in understanding the operation of the synchronous rectifier 230, a series of graphs are presented that show the relationship between the current in the transformer windings and the transistor $Q_1$ voltages.

Figure 7:
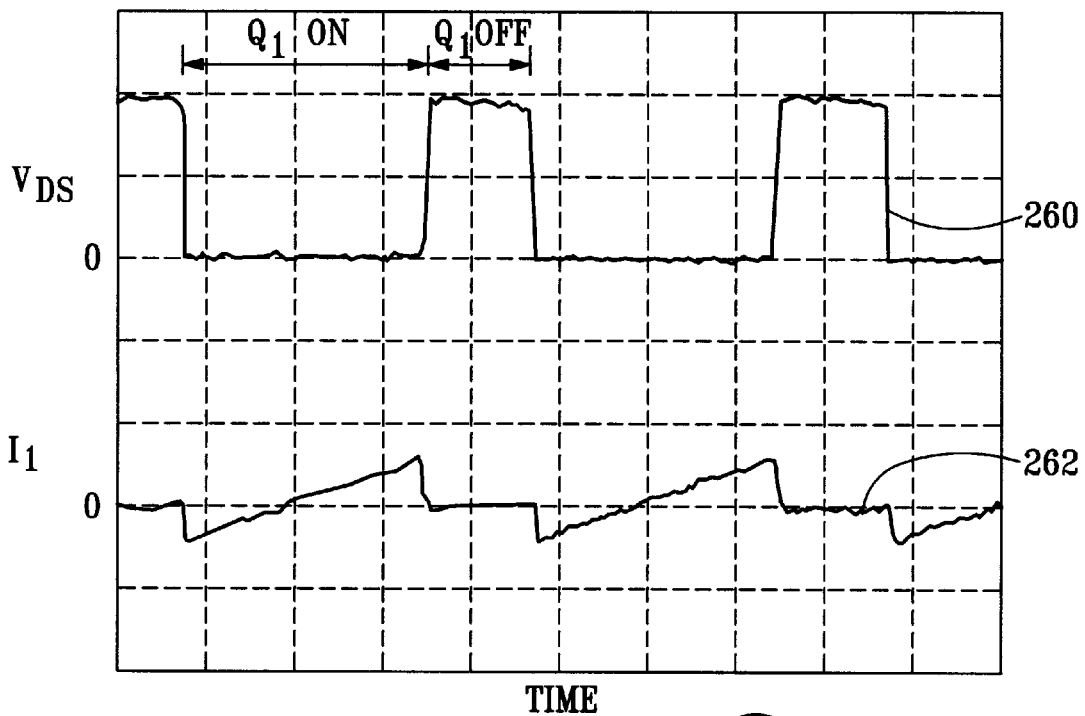
FIG. 7 is a graph illustrating the voltage $V_{DS}$ of transistor $Q_1$ and the current $I_1$ during the periods when $Q_1$ is ON and OFF.

A graph illustrating the voltage $V_{DS}$ across $Q_1$ and the corresponding current $I_1$ during the periods when $Q_1$ is ON and OFF is shown in FIG. 7. The trace 260 shows the voltage $V_{DS}$ of transistor $Q_1$ during the time $Q_1$ is on and off. During the time $Q_1$ is on, $V_{DS}$ is zero and $R_{DS} \approx 0$. The voltage $VL_1$ across the primary is given by $$V_{L1} = L_1 \cdot \frac{dI_1}{dt} \tag{16}$$

However, since $V_{IN}$ is a constant and $VL_1 = V_{IN}$, the magnitude of the current $I_1$ flowing through the primary 176 can be expressed as the following $$I_1 = \frac{V_{IN}}{L_1} \cdot t + C \tag{17}$$

where C is a negative constant. Thus, the current $I_1$ in the primary, as shown in trace 262, steadily increases, from an initial negative value to a final positive value. The current $I_1$ is initially negative due to the voltage impressed on it from the secondary during the previous cycle when $Q_1$ was off.

When the PWM signal from the controller 100 turns $Q_1$ off the voltage $V_{DS}$ is rising and $R_{DS} \to \infty$. When $Q_1$ turns off, the current $I_1$ through the primary 176 is zero.

Figure 8:
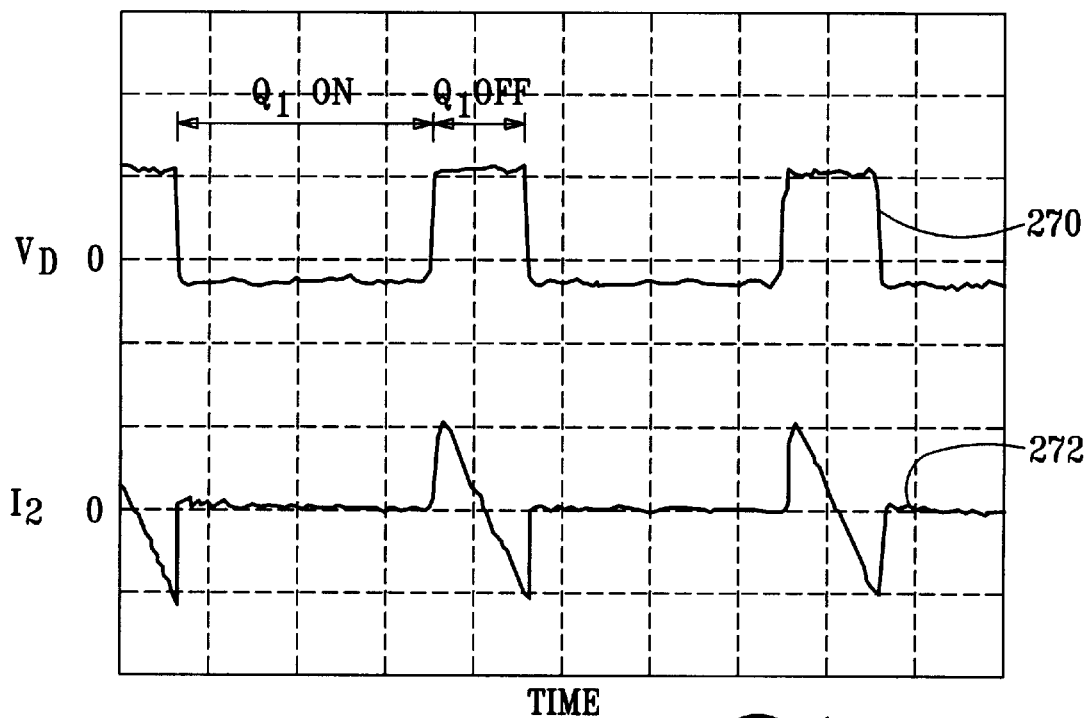
FIG. 8 is a graph illustrating the voltage $V_D$ across the series combination of diodes 202, 204 and the current $I_2$ during the periods when $Q_1$ is ON and OFF.

A graph illustrating the voltage across the series combination of diodes 202, 204 and the current $I_2$ during the periods when $Q_1$ is ON and OFF is shown in FIG. 8. While transistor $Q_1$ is on and current flows through the primary, the voltage $V_D$ is approximately −5.8 V as shown in trace 270. Transistor $Q_2$ is off, diode 184 is reverse biased and no current flows through the secondary 178, i.e., the current $I_2$ is zero, as shown in trace 272.

When transistor $Q_1$ turns off, the back EMF generates 25 V across the secondary 208 and the voltage $V_D$ increases to approximately 31.2 V. This is sufficient to turn on transistor $Q_2$ thus permitting negative $I_2$ current to flow. Initially, however, the current $I_2$ is positive and, although the synchronous rectifier is on, current cannot flow through it due to the reverse biased diode 192. The current $I_2$ steadily decreases until it reverses direction and becomes negative. The synchronous rectifier 230 permits the current $I_2$ to flow in the negative direction as described in detail above.

Figure 9:
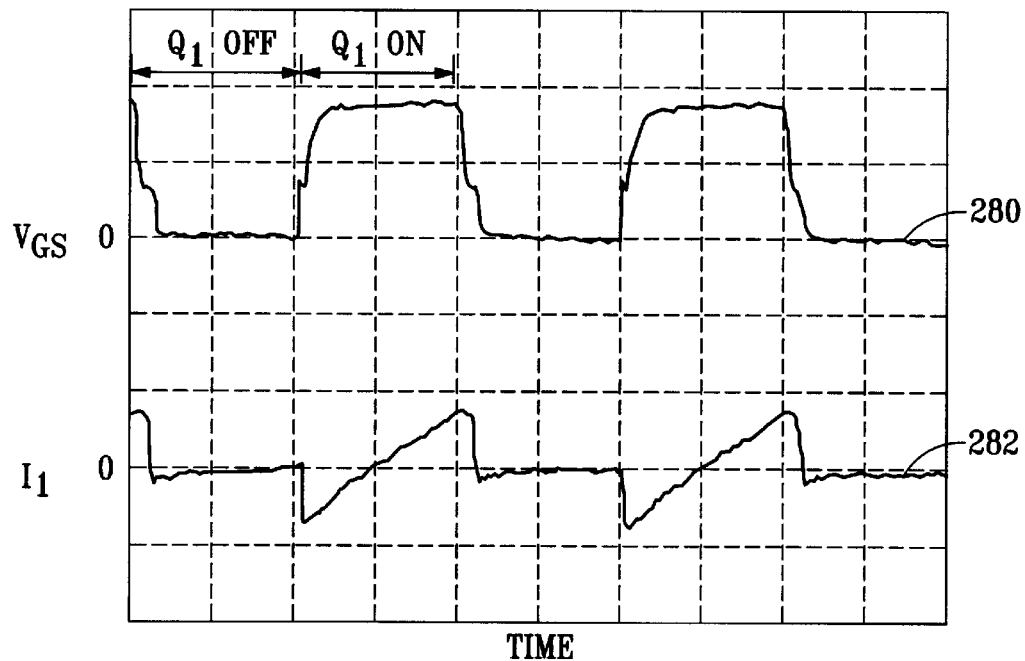

A graph illustrating the voltage $V_{GS}$ of transistor $Q_1$ and the current $I_1$ during the periods when $Q_1$ is OFF and ON is shown in FIG. 9. While $V_{GS}$ is zero, as shown in trace 280, transistor $Q_1$ is off. The current $I_1$ through the primary is thus zero, as shown in trace 282. When the PWM signal from the controller goes high, VGS goes to a high level and transistor $Q_1$ turns on. This causes the primary current flow $I_1$ to steadily increase in accordance with the following expression, as given hereinabove $$I_1 = \frac{V_{IN}}{L_1} \cdot t + C \tag{18}$$

Figure 10:
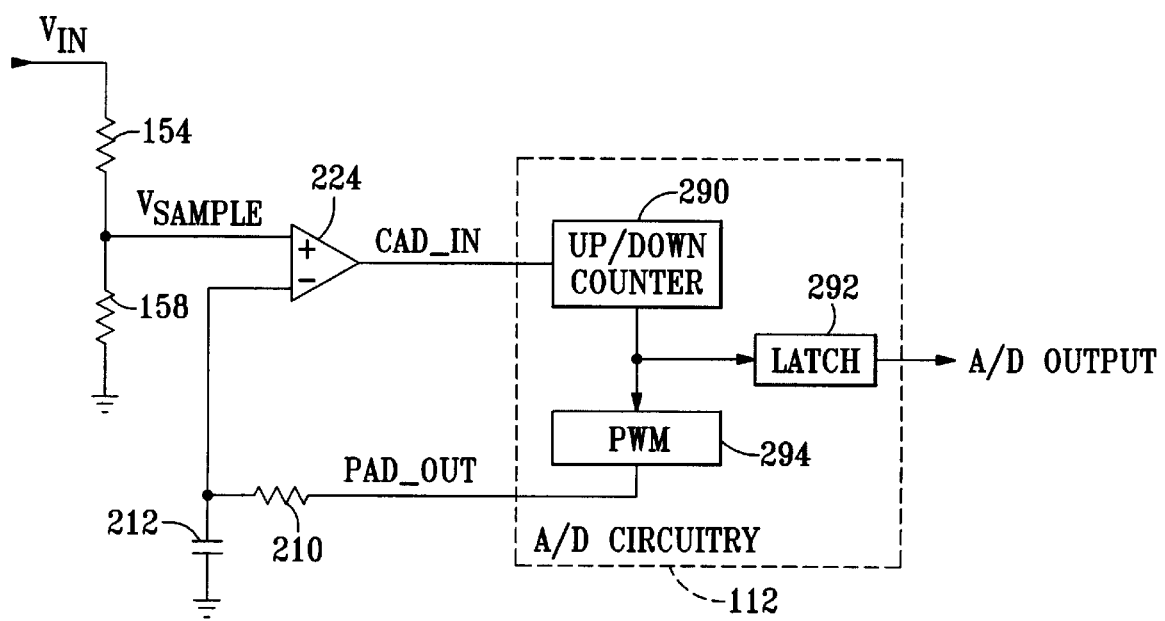
FIG. 10 is a schematic block diagram illustrating the A/D converter and associated circuitry is more detail.

The A/D converter and its associated circuitry will now be described in more detail. A schematic block diagram illustrating the A/D converter and associated circuitry is more detail is shown in FIG. 10. To aid in understanding, the A/D portion of the controller 100 is shown with the input sampling circuitry of the ringer circuit 150 (FIG. 6). In particular, the input voltage $V_{IN}$ is applied to a voltage divider comprising resistors 154, 158. The output of the voltage divider, denoted $V_{SAMPLE}$, is input to the plus input of comparator 224. The output of the comparator, denoted CAD_IN, is input to the A/D circuitry 112.

The A/D converter circuitry 112 comprises an 8 bit up/down counter 290, PWM generator 294 and an 8 bit latch 292 The output of the latch forms the output of the AID converter and can range from 0 to 255. The counter output is coupled to the PWM generator 294 and the latch 292. The output of the PWM generator 294, denoted PAD_OUT, is input to a low pass filter which is connected to the minus input of the comparator 224. The low pass filter comprises series resistor 210 and capacitor 212 connected between the minus input of the comparator 224 and ground.

In operation, a high level for CAD_IN causes the counter 290 to increase its count. This causes the output of the PWM 294, i.e., PAD_IN to increase its duty cycle which causes the voltage at the minus input of comparator 224 to increase. Eventually, CAD_IN goes low which causes the counter 290 to reduce its count. Which, in turn, causes PAD_OUT to decrease its duty cycle and the voltage on the minus input of the comparator 224 to decrease. Once steady state conditions are reached, i.e., a slowly varying input voltage $V_{IN}$, the counter value will oscillate around the value of the sampled voltage. The combination of resistor 210 and capacitor 212 function to smooth, i.e., integrate, the PAD_OUT signal.

It is recalled that the expression for the output voltage $V_{OUT}$ is given as in Equation 7

$$V_{OUT} = N \cdot V_{IN} \cdot \frac{D}{1-D} \tag{7}$$

Solving for D yields $$D = \frac{V_{OUT}}{N \cdot V_{IN} + V_{OUT}} \tag{8}$$

The value representative of $V_{OUT}$ is an 7 bit number output by the sine generator 128 (FIG. 4) that can range in value from 0 to 100 corresponding to a $V_{OUT}$ of 0 to 100 V peak or 70 Vrms. Thus, $V_{OUT}$ can be expressed as $$V_{OUT} = \sin(x) \times 100 \tag{19}$$

An expression for $N \cdot V_{IN}$ is given by $$N \cdot V_{IN} = A/D\ OUTPUT \times \frac{16}{32} \tag{20}$$
$$= V_{IN} \times \frac{R_{158}}{R_{154} + R_{158}} \times \frac{255}{5} \times \frac{16}{32}$$

where $R_{154}$ and $R_{158}$ correspond to the values of resistors 154, 158, respectively. The value 255 represents the maximum value of the A/D converter output while the value 5 represents a 5 V full scale value for the input voltage. The term $$\frac{16}{32}$$

is the protection multiplier used to provide the ringer with overcurrent protection. The factor of 2 present in the equations presented above, is already factored into the terms of the equation.

Thus, an expression for N can be written as follows $$N = \frac{R_{158}}{R_{154} + R_{158}} \times 25.5 \tag{21}$$

For values of $V_{OUT}$ other than 100 V peak, the equation above becomes $$N = \frac{R_{158}}{R_{154} + R_{158}} \times 25.5 \times \frac{100}{V_{OUT}} \tag{22}$$

It is important to note that the above equations are presented assuming the following $V_{OUT}$=100 V peak $V_{IN}$=12 V

N=4

$N \cdot V_{IN}$=48

Given the above as o n for the duty cycle D can be written as $$D = \frac{\sin(x) \cdot 100}{\sin(x) \cdot 100 + V_{IN} \cdot \frac{R_{158}}{R_{154} + R_{158}} \cdot \frac{255}{5} \cdot \frac{16}{32}} \tag{23}$$

If other values of input voltage are desired, the turns ratio N must be modified accordingly. The following table provides values of N for typical values of input voltage.

| $V_{IN}$ | N |
|---|---|
| 5 | 9 |
| 12 | 4 |
| 24 | 2 |
| 48 | 1 |

In constructing a ring generator circuit based on the controller of the present invention, one should first choose the input voltage. Once the input voltage is chosen, this determines the value of N for the transformer. The value of resistors 154, 158 can then be chosen once N is determined.

Figure 11A:
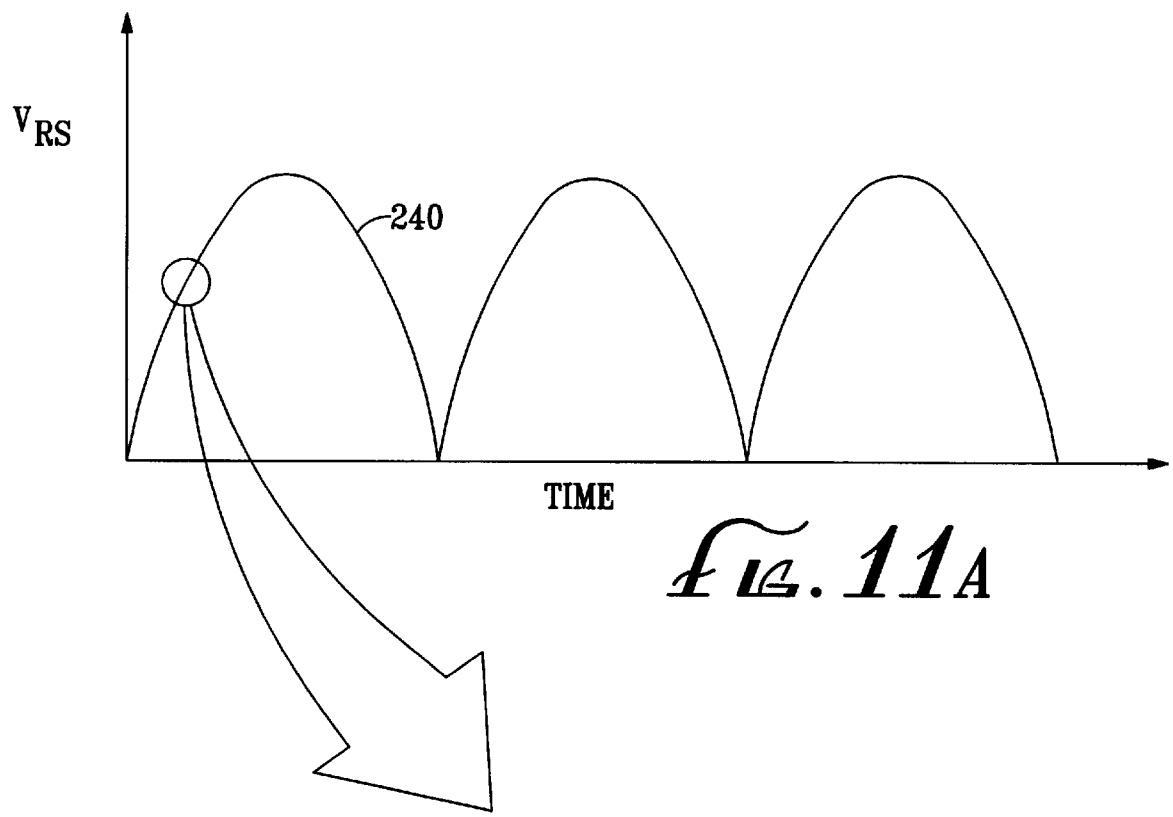
FIG. 11A is a diagram illustrating the half wave rectified sinusoidal waveform generated by the ring generator circuit at the input to the output bridge circuitry.

A diagram illustrating the half wave rectified sinusoidal waveform generated by the ring generator circuit at the input to the output bridge circuitry is shown in FIG. 11A. The half sine wave as shown in trace 240, is the voltage $V_{RS}$ that is generated across the capacitor 186 (FIG. 6) and input to the output bridge circuit 200.

Figure 11B:
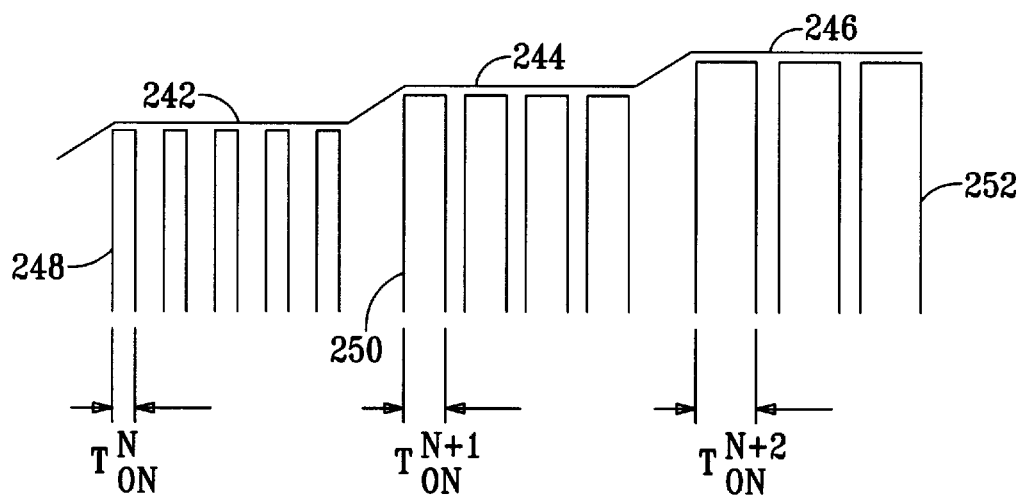
FIG. 11B is a diagram illustrating the half wave rectified sinusoidal waveform of FIG. 11A in more detail highlighting the varying widths of the controller PWM output pulses used to generate the output waveform.

A diagram illustrating the half wave rectified sinusoidal waveform of FIG. 11A in more detail highlighting the varying widths of the pulses used to generate the output waveform is shown in FIG. 11B. An examination of FIG. 11B reveals that the output voltage is a sequence of DC values, smoothed to resemble a sine wave. For illustration purposes, three steps of the output voltage 242, 244, 246 are shown. A plurality of pulses 248 having a duty cycle $T_{ON}^N$ make up the portion of the output voltage referenced 242. As the value of the sine function increase, the pulse width increases accordingly. Step 244 is comprised of pulses having a pulse width $T_{ON}^{N+1}$. Similarly, step 246 is comprised of pulses having a width $T_{ON}^{N+2}$.

Figure 12:
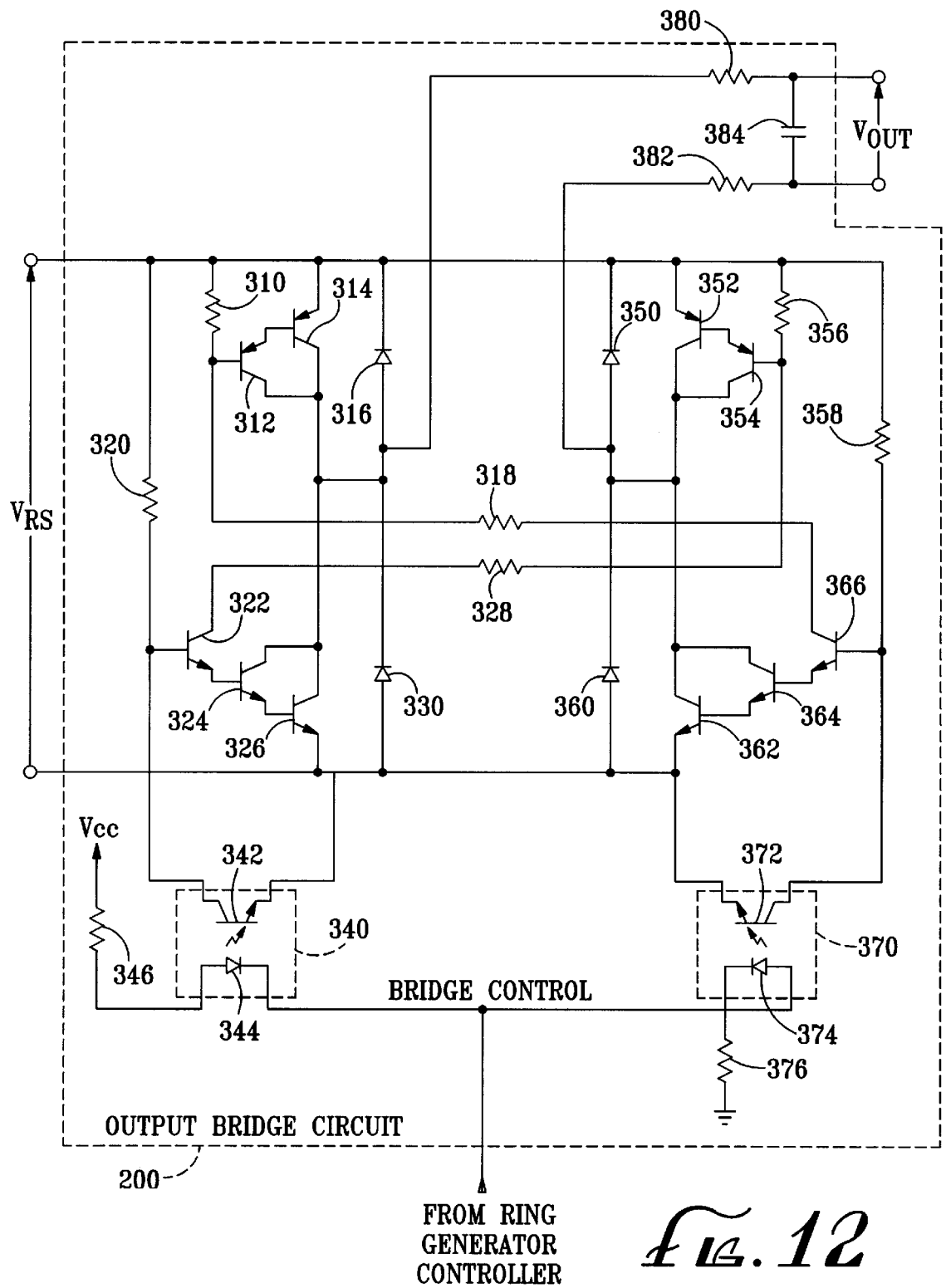
FIG. 12 is a schematic diagram illustrating the output bridge circuitry in more detail.

The output bridge circuit will now be described in more detail. A schematic diagram illustrating the output bridge circuitry in more detail is shown in FIG. 12. The output bridge circuit, generally referenced 200, functions to convert the half sine wave signal $V_{RS}$ to a full sine wave with positive and negative transitions. Since output bridge circuits are well known in the art, the circuit 200 presented herein will not be described in great detail.

The output bridge circuit 200 comprises four switches controlled by the bridge control signal BRC output from the sine generator 128 (FIG. 4). This signal is input to two opto couplers 340, 370. Opto coupler 340 comprises LED 344 and transistor 342. The anode of LED 344 is coupled to $V_{CC}$ via resistor 346. Similarly, opto coupler 370 comprises LED 374 and transistor 372. The cathode of LED is coupled to ground via resistor 376. The bridge control signal is connected to the cathode of LED 344 and the anode of LED 374.

The bridge control signal is a square wave signal having a period equal to that of the sine wave generated. Assuming the bridge control signal is initially high, the LED 374 in opto coupler 370 conducts while the LED 344 in opto coupler 340 is off. Thus, transistor 372 is on and the switch comprised of NPN transistors 366, 364, 362 are all off. Current does flow through resistor 358. In addition, current cannot flow through resistors 310, 318 therefore PNP transistors 312, 314 are off.

If opto coupler 340 is off, currents flows through resistor 320 to provide base drive to turn on transistors 322, 324, 326. Thus, current flows through resistors 356, 328 turning on transistors 352, 354. Thus, a current path is created from $V_{RS}$ through transistor 352, resistor 382 to $V_{OUT}$ and through the load, resistor 380, transistor 326 and returning to $V_{RS}$.

Assuming now the bridge control signal goes low, the LED 344 in opto coupler 340 conducts while the LED 374 in opto coupler 370 shuts off. Thus, transistor 342 is on and the switch comprised of NPN transistors 322, 324, 326 are all off. Current does flow through resistor 320. Current cannot flow through resistors 356, 328 therefore PNP transistors 352, 354 are off.

If opto coupler 370 is off, current flows through resistor 358 to provide base drive to turn on transistor 366, 364, 362. Thus, current flows through resistors 310, 318 turning on transistors 312, 314. A current path is thus created from $V_{RS}$ through transistor 314, resistor 380 to $V_{OUT}$ and through the load, resistor 382, transistor 362 and returning to $V_{RS}$.

Capacitor 384 in combination with resistors 380, 382 smooth the output voltage $V_{OUT}$. Resistors 380, 382 are preferable low valued such as on the order of 10 ohms. Capacitor is preferably on the order of 0.1 $\mu$F. Diodes 316, 330, 350, 360 function to reduce voltage spikes and protect the output bridge and related circuitry.

General DC to AC Open Loop Converter Topologies

Having described a specific example of a continuous mode, PWM controlled open loop flyback DC to AC converter, a discussion of several more general applications of the controller and method of the present invention to various type of open loop DC to AC converters is presented hereinbelow. Applications of the controller of the invention to well known converter configurations of the type buck, boost and forward will now be presented. More information on well known types of power supplies and converters can be found in "The Art Of Electronics," P. Horowitz, W. Hill, Second Edition, 1989.

General Block Diagram

A block diagram illustrating the general case of the open loop controller of the present invention is shown in FIG. 13. The block diagram shown in FIG. 13 has been modified so as to adapt the open loop controller for the general case. The open loop controller, generally referenced 550, comprises the necessary elements to generate a PWM signal for controlling a plurality of different types of converters. The equation given above for the general DC transfer function of any switching power supply was given above as $$V_O(t) = K \cdot N \cdot V_{IN}(t) f_1(D,t) \cdot f_2(f_S, t) \qquad (1)$$

where

K is the topology factor;

N is the transformer turns ratio (N=1 for secondary/primary ratio =1 or for non isolated topologies;

$V_{IN}(t)$ is the input voltage which can be AC or DC; typically it is DC since if the input voltage is AC it is rectified and filtered for low ripple content which simplifies the derivation of $f_1(d,t)$;

$V_O(t)$ is the desired output voltage;

D is the duty cycle of the PWM signal;

$f_S$ is the switching frequency;

This equation can be used to construct a processing block for calculating the value of D to be input to a PWM generator circuit.

More specifically, with reference to FIG. 13, The input voltage is digitized by A/D converter 552 and input to the calculation block 554. This block functions to calculate the value of D given the various parameters. Each of the function variables are known. The input voltage $V_{IN}$ is sampled; the output voltage $V_{OUT}$ is also known, since it the voltage that is desired to be generated at the output; the value of K is known (K=1 for the ring generator example given above); and N is also known.

The $V_{OUT}$ generator circuit 558 generates the desired output voltage. This signal is input to the calculation block 554. The duty cycle value D is input to a conventional pulse width modulation (PWM) circuit 556 which functions to generate a square wave output signal having with a duty cycle that varies in accordance with D. Two output signals PWM and $\overline{\text{PWM}}$ are generated by the PWM circuit. These two signals are buffered by output buffers 560, 562, respectively. The output buffers generate a signal capable of driving a FET switch.

Note that in the ring generator example above, the VOUT generator comprises a sine wave generator. Alternatives for the generator 558 comprise a read only memory (ROM) containing a digitally sampled function.

It should be apparent to those skilled in the electrical arts that the controller 550 of FIG. 13 can be realized in many different ways as long as the equation for the duty cycle D is implemented.

Buck Converter Topology

A block diagram illustrating a second embodiment of the open loop controller adapted to control a converter having a buck topology is shown in FIG. 14. The block diagram shown in FIG. 3 has been modified so as to adapt the open loop controller to a converter having a buck topology. The buck topology open loop controller, generally referenced 400, comprises the necessary elements to generate a PWM signal for controlling a buck type converter. The duty cycle D of the PWM signal can be expressed as $$D = \frac{V_{OUT}}{V_{IN}} \tag{24}$$

Each of the entities on the right side of the equation are known. The input voltage $V_{IN}$ is sampled and input to the controller as shown in FIG. 1. The output voltage $V_{OUT}$ is also known, since it the voltage that is desired to be generated at the output.

With reference to FIG. 14, the controller 400 comprises an A/D converter 402, divider 404, PWM circuit 406, output buffers 408, 410, clock circuitry 412 and sine generator 414. The input voltage $V_{IN}$ is input to the A/D converter 402 that output a voltage representative of $V_{IN}$. The output of the A/D converter is input to one of the two inputs of divider 404.

Clock circuitry generates the necessary clock signals to drive sine generator 414 which can comprise a read only memory (ROM) containing a digitally sampled sine function. Note that only 90 degrees of sine function data is required. The output of the sine generator represents the output voltage $V_{OUT}$. This is then input to the second input of divider 404. The divider 404 generates the dividend D in accordance with Equation 20 above.

The duty cycle value D is input to a conventional pulse width modulation (PWM) circuit 406 which functions to generate a square wave output signal having a duty cycle D. Two output signals PWM and $\overline{\text{PWM}}$ are generated by the PWM circuit. These two signals are buffered by output buffers 408, 410, respectively. The output buffers generate a signal capable of driving a FET switch.

It should be apparent to those skilled in the electrical arts that the controller 400 of FIG. 14 can be realized in many different ways as long as the equation for the duty cycle D is implemented.

Figure 15:
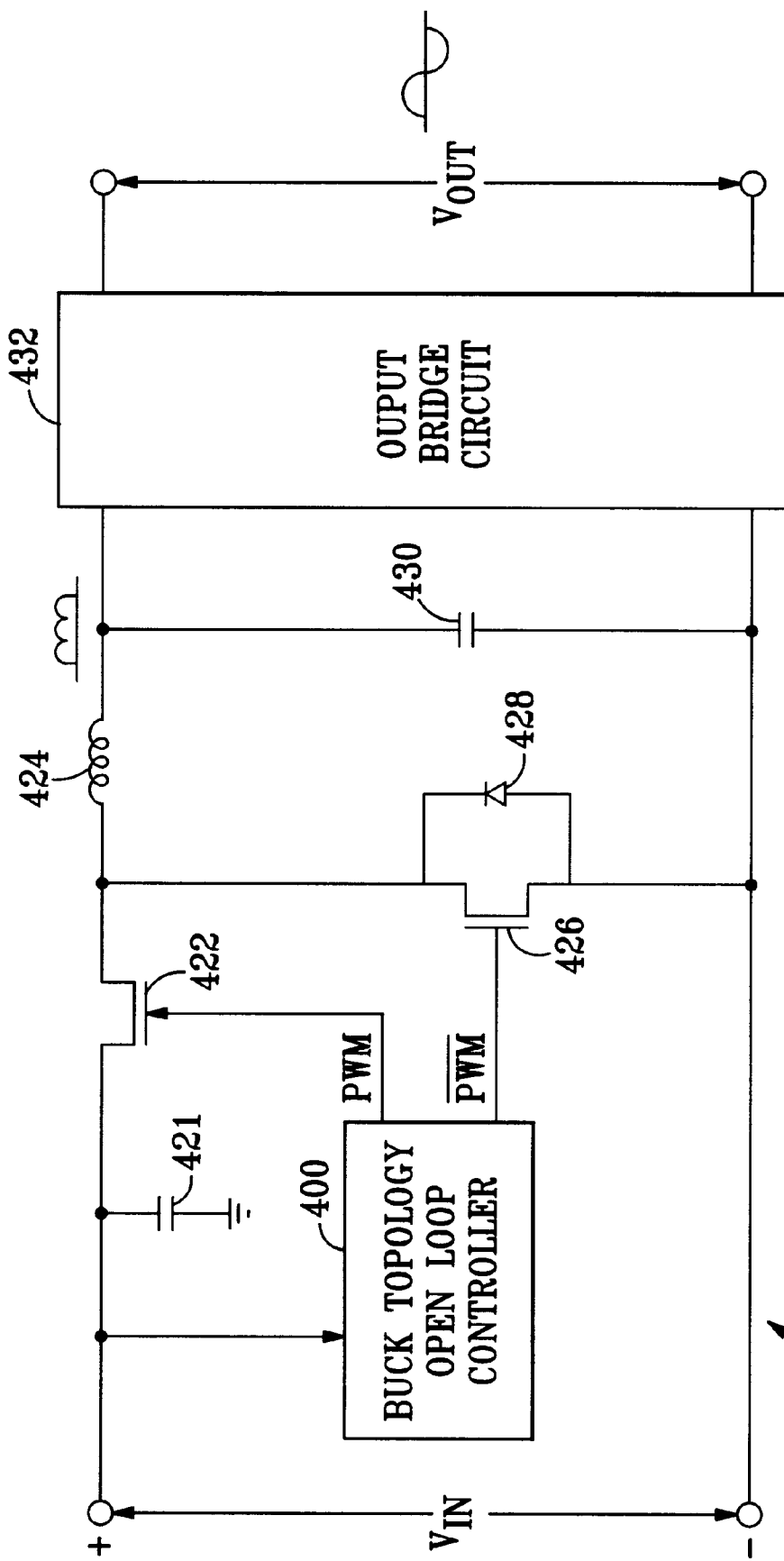
FIG. 15 is a schematic diagram of the second embodiment of a ring generator circuit having a buck topology constructed in accordance with the present invention.

A schematic diagram of the second embodiment of a ring generator circuit having a buck topology constructed in accordance with the present invention is shown in FIG. 15. For clarity, a simplified topology of the buck converter is shown. One skilled in the art, however, could optionally add components to provide additional functionality beyond what is shown.

The buck converter circuit, generally referenced 420, comprises coil 424, capacitors 421, 430, FETs 422, 426, diode 428 and output bridge circuit 432. The primary characteristics of the controller and corresponding buck converter circuit are (1) that the circuit operates in an open loop fashion as opposed to traditional closed loop design, (2) that the circuit is operative to generate an AC sine wave from a DC input, (3) that the resultant circuit is simple and inexpensive to manufacture and (4) that the resultant control circuit can optionally be realizable in an ASIC.

The controller 400 functions to sample the input voltage $V_{IN}$ and to generate the drive signal for switch (FET) 422. It will be appreciated by those skilled in the art that circuit 420 has an open loop topology with no feedback from the output voltage $V_{OUT}$. The controller 400 generates a pulse width modulated (PWM) signal to switch the FET 422 on and off such that a rectified half sine wave is generated at the input to the output bridge circuit 432. The output bridge circuit 432 functions to generate a full output sine wave from the rectified sine wave input thereto.

The operation of circuit 420 will now be described in more detail. As discussed previously, the circuit functions to generate a half sine wave signal, which the output bridge circuit 432 converts into the full sine wave output signal $V_{OUT}$, in open loop fashion with no sampling of the output signal. This is achieved by utilizing the well known transfer function for a buck converter as shown below in Equation 25. The transfer function of the circuit, in combination with known entities in the circuit, is used to calculate the duty cycle of the switching signal applied to the switch 422. The transfer (or transmission) function relates the output voltage as a function of the duty cycle and input voltage and is expressed below as $$\frac{V_{OUT}}{V_{IN}} = D \tag{25}$$

where $V_{OUT}$=half sine wave output voltage $V_{IN}$=input voltage

D=duty cycle of the PWM signal input to the switch

Thus, the output voltage $V_{OUT}$ can be expressed as $$V_{OUT} = D \cdot V_{IN} \tag{26}$$

It is important to note that the above equation for the transfer function is valid only when the current through the coil 424 is continuous. Thus, during each and every cycle of the circuit, a current must flow through the coil 424.

Considering the above transfer function, all the entities with the exception of the duty cycle can be determined beforehand. The output voltage $V_{OUT}$ is a known entity. The input voltage $V_{IN}$ is also known as it can be periodically sampled. The only entity not known or predetermined is the duty cycle D that must be calculated each cycle.

Thus, the controller 400, functions to calculate during each cycle, the duty cycle D which is used to adjust accordingly, the pulse width of the switching signal applied to the gate of the FET 422.

Continuous current through the transformer can be achieved by one of two methods. The first is to place a minimum load in the current path through the indictor and the second is to use a synchronous rectifier circuit, i.e., FET 426, or as shown in the embodiment shown in FIG. 6.

The buck converter 420 is a based on the well known step down PWM converter. At the beginning of the cycle when the FET switch 422 is closed, the voltage $V_X$ is shorted to $V_{IN}$ such that $V_{OUT}-V_{IN}$ is applied across the inductor 424 causing a linearly increasing current to flow through the inductor and the output capacitor 430 in accordance with the well known equation $$\frac{dI}{dt} = \frac{V}{L} \tag{27}$$

When the FET switch 422 turns off, the voltage at the $V_X$ point decreases rapidly as the inductor attempts to maintain constant current. The diode 428 turns on and the current through the inductor 424 continues to flow in the same direction but with opposite voltage polarity across the inductor. The current path includes diode 428, inductor 424 and capacitor 430. The inductor 424 continues to dump current into the capacitor 430. At this point in the cycle the voltage applied across the inductor is $V_{OUT}+V_{428}$. The current decreases linearly in accordance with the same well known Equation 27 above. At the beginning of the next cycle the FET switch 422 is on again and the circuit operates according to the same principles described above.

It is important to note that the output voltage generated can only be lower than the input voltage. The FET switch 426, working complimentary to FET 422, functions as a synchronous rectifier using the same principles of operation as $Q_2$ in FIG. 6, i.e., to maintain the operation of the circuit in a continuous current mode. The FET 426 is required to permit capacitor 430 to discharge, i.e., transfers energy back from the output to the input.

Boost Converter Topology

Figure 16:
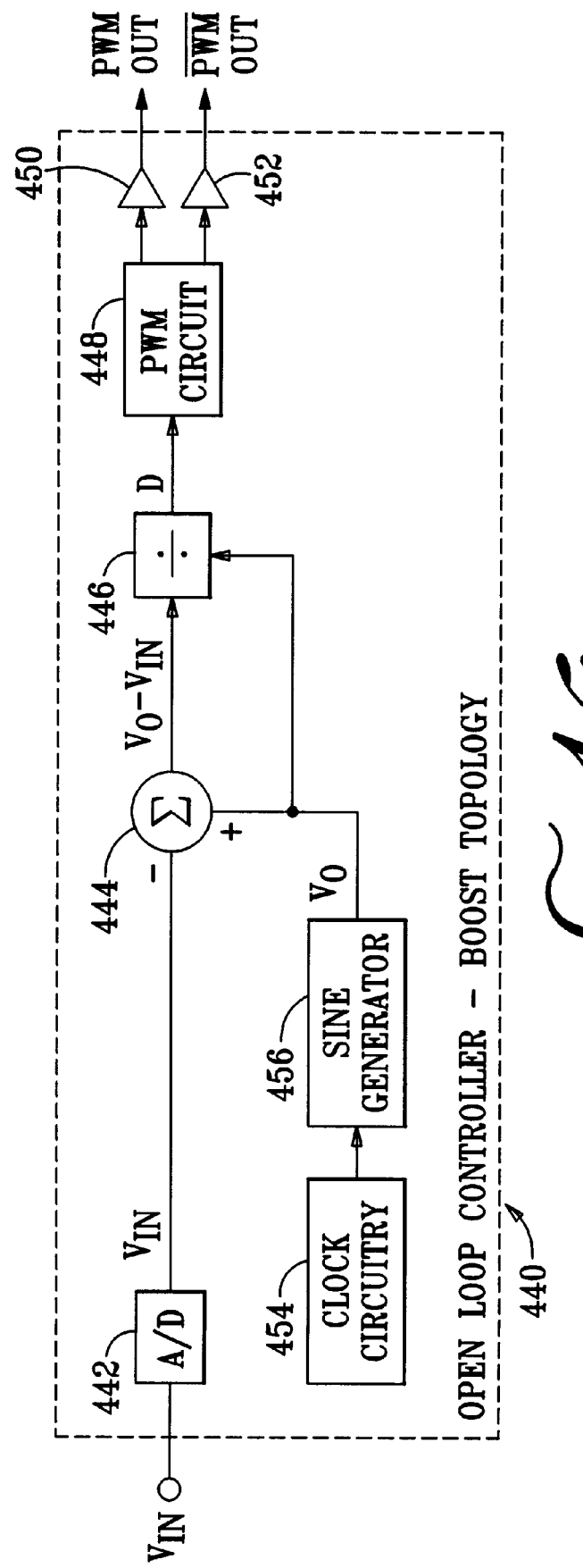
FIG. 16 is a block diagram illustrating a third embodiment of the open loop controller adapted for a converter having a boost topology.

A block diagram illustrating a third embodiment of the open loop controller adapted for a converter having a boost topology is shown in FIG. 16. In this third embodiment, the block diagram shown in FIG. 3 has been modified to adapt the open loop controller to a boost type converter. The boost type open loop controller, generally referenced 440, comprises the necessary elements to generate a PWM signal for controlling a boost type converter. The duty cycle D of the PWM signal can be expressed as $$D = \frac{V_{OUT} - V_{IN}}{V_{OUT}} \tag{28}$$

Each of the entities on the right side of the equation are known. The input voltage $V_{IN}$ is sampled and input to the controller as shown in FIG. 1. The output voltage $V_{OUT}$ is also known, since it the voltage that is desired to be generated at the output.

With reference to FIG. 16, the controller 440 comprises an A/D converter 442, summer 444, divider 446, PWM circuit 448, output buffers 450, 452, clock circuitry 454 and sine generator 456. The input voltage $V_{IN}$ is input to the A/D converter 442 that outputs a voltage representative of $V_{IN}$. This signal is input to the summer 444. The summer 444 functions to generate the difference $V_{OUT}-V_{IN}$. The difference is input to the one of the two inputs of the divider 446.

Clock circuitry generates the necessary clock signals to drive sine generator 456 which can comprise a read only memory (ROM) containing a digitally sampled sine function. Note that only 90 degrees of sine function data is required. The output of the sine generator represents the output voltage $V_{OUT}$. This is then input to the second input of divider 446. The divider 446 generates the dividend D in accordance with Equation 21 above.

The duty cycle value D is input to a conventional pulse width modulation (PWM) circuit 448 which functions to generate a square wave output signal having a duty cycle D. Two output signals PWM and $\overline{\text{PWM}}$ are generated by the PWM circuit. These two signals are buffered by output buffers 450, 452, respectively. The output buffers generate a signal capable of driving a FET switch.

It should be apparent to those skilled in the electrical arts that the controller 440 of FIG. 16 can be realized in many different ways as long as the equation for the duty cycle D is implemented.

Figure 17:
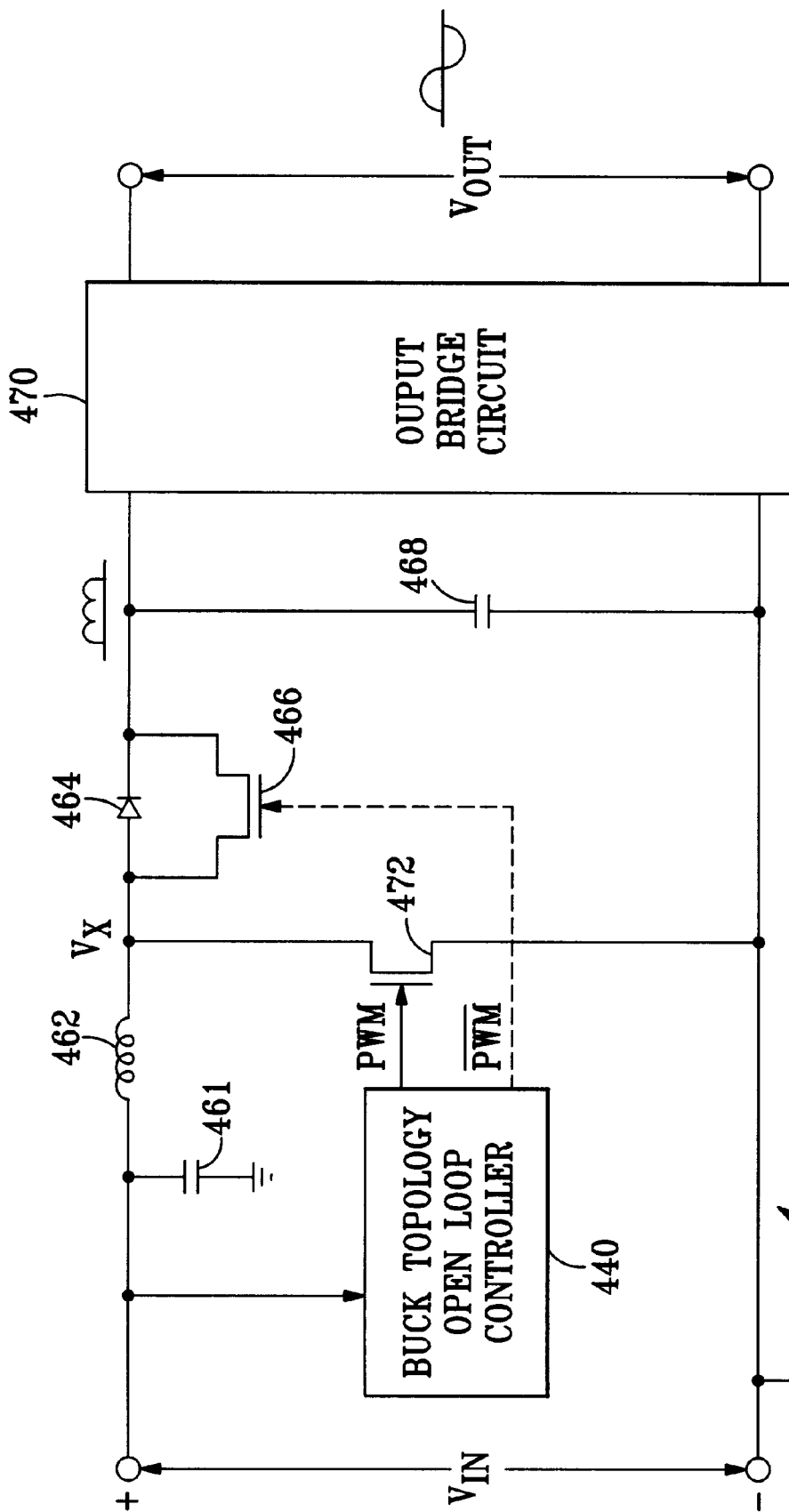
FIG. 17 is a schematic diagram of the third embodiment of a ring generator circuit having a boost topology constructed in accordance with the present invention.

A schematic diagram of the third embodiment of a ring generator circuit having a boost topology constructed in accordance with the present invention is shown in FIG. 17. For clarity, a simplified topology of the boost converter is shown. One skilled in the art, however, could optionally add components to provide additional functionality beyond what is shown.

The boost converter circuit, generally referenced 460, comprises a coil 462, capacitors 461, 468, FETs 472, 466, diode 464 and output bridge circuit 470. The primary characteristics of the controller and boost converter circuit are (1) that the circuit operates in an open loop fashion as opposed to traditional closed loop design, (2) that the circuit is operative to generate an AC sine wave from a DC input, (3) that the resultant circuit is simple and inexpensive to manufacture and (4) that the resultant control circuit can optionally be realizable in an ASIC.

The controller 440 functions to sample the input voltage $V_{IN}$ and to generate the drive signal for switch (FET) 472. It will be appreciated by those skilled in the art that circuit 460 has an open loop topology with no feedback from the output voltage $V_{OUT}$. The controller 440 generates a pulse width modulated (PWM) signal to switch the FET 472 on and off such that a rectified half sine wave is generated at the input to the output bridge circuit 470. The output bridge circuit 470 functions to generate a full output sine wave from the rectified sine wave input thereto.

The operation of circuit 460 will now be described in more detail. As discussed previously, the circuit functions to generate a half sine wave signal, which the output bridge circuit 470 converts into the full sine wave output signal $V_{OUT}$, in open loop fashion with no sampling of the output signal. This is achieved by utilizing the well known transfer function for a boost converter as shown above in Equation 21. The transfer function of the circuit, in combination with known entities in the circuit, is used to calculate the duty cycle of the switching signal applied to the switch 472. The transfer (or transmission) function relates the output voltage as a function of the duty cycle and input voltage and is expressed below as $$\frac{V_{OUT}}{V_{IN}} = \frac{1}{1-D} \tag{29}$$

where $V_{OUT}$=half sine wave output voltage $V_{IN}$=input voltage

D=duty cycle of the PWM signal input to the switch

Thus, the output voltage $V_{OUT}$ can be expressed as $$V_{OUT} = \frac{V_{IN}}{1-D} \quad (30)$$

It is important to note that the above equation for the transfer function is valid only when the current through the inductor 462 is continuous. Thus, during each and every cycle of the circuit, a loop of current must flow in the inductor 462.

Considering the above transfer function, all the entities with the exception of the duty cycle can be determined beforehand. The output voltage $V_{OUT}$ is a known entity, even though it is the voltage that the circuit is generating. The input voltage $V_{IN}$ is also known as it can be periodically sampled. The only entity not known or predetermined is the duty cycle D that must be calculated each cycle.

Thus, the controller 440, functions to calculate during each cycle, the duty cycle D which is used to adjust accordingly, the pulse width of the switching signal applied to the gate of the FET 472.

The boost converter 460 shown in FIG. 17 is a based on the well known step up PWM converter. When the FET switch 472 is closed, the voltage $V_X$ is shorted to ground and $V_{IN}$ is applied across the inductor 462 casing a linearly increasing current to flow through the inductor in accordance with the well known equation $$\frac{dI}{dt} = \frac{V}{L} \quad (31)$$

When the FET switch 472 turns off, i.e., opened, the voltage $V_X$ rises rapidly as the inductor 462 attempts to maintain a constant current. The diode 464 becomes forward biased and the current through the inductor 462 continues to flow in the same direction. The current path now includes inductor 462, diode 464 and capacitor 468. During this part of the cycle, the inductor 462 dumps current into the capacitor 468 while the voltage applied across the inductor is given by $$V_{462} = V_{OUT} - V_{IN} - V_{464} \quad (32)$$

The current decreases in accordance with the same well known Equation 31 above. At the beginning of the next cycle the FET switch 472 is closed once again and the circuit operates as described above.

It is important to note that the output voltage generated can be much higher then the input voltage. Current flows through the diode and FET 466 to charge the capacitor 468 beyond $V_{IN}$. In addition, the FET switch 466 functions as a synchronous rectifier using the same principles of operation as $Q_2$ in FIG. 6, i.e., to maintain the operation of the circuit in a continuous current mode. The FET 466 is required to permit current to flow from capacitor 468. The dashed line to the gate of FET 466 denotes that some form of isolation is required such as a pulse transformer or the circuitry related to the synchronous rectifier 230 shown in FIG. 6.

Forward Converter Topology

Figure 18:
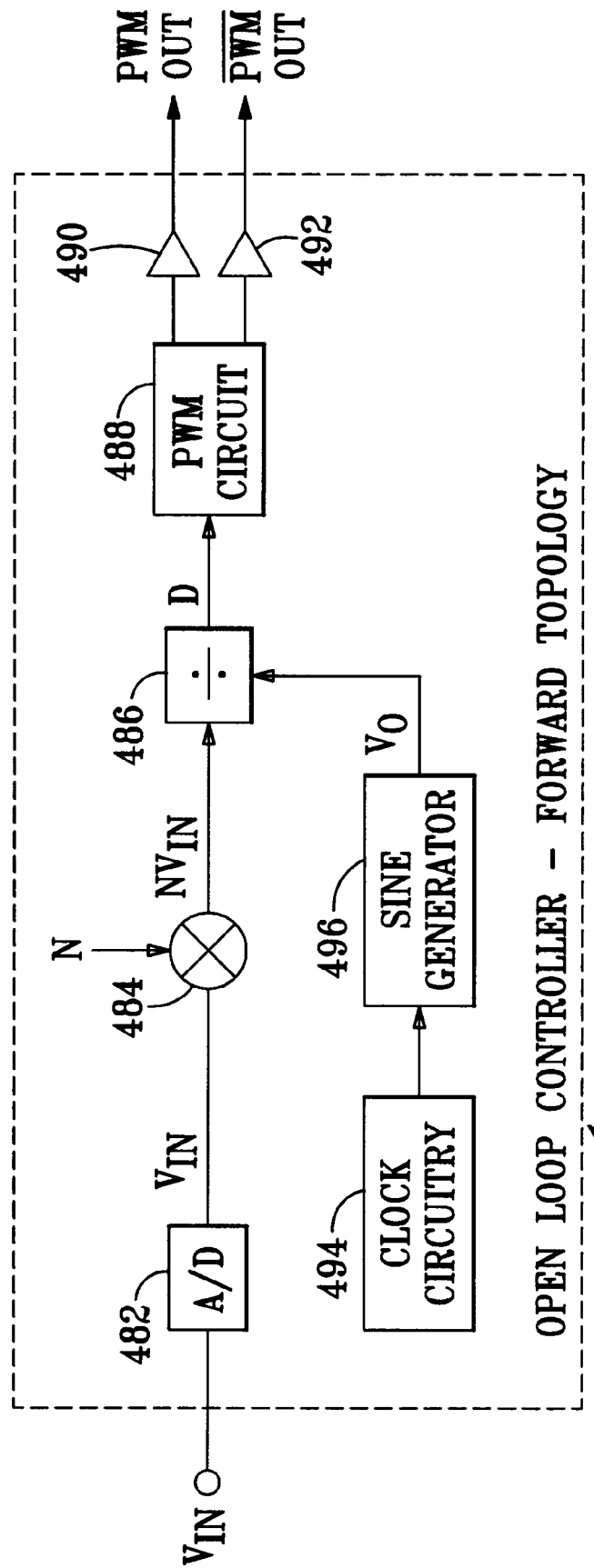
FIG. 18 is a block diagram illustrating a fourth embodiment of the open loop controller adapted for a converter having a forward topology.

A block diagram illustrating a fourth embodiment of the open loop controller adapted to a converter having a forward topology is shown in FIG. 18. In this fourth embodiment, the block diagram shown in FIG. 3 has been modified to adapt the open loop controller to a forward type converter. The forward type open loop controller, generally referenced 480, comprises the necessary elements to generate a PWM signal for controlling a forward type converter. The duty cycle D of the PWM signal can be expressed as $$D = \frac{V_{OUT}}{N \cdot V_{IN}} \quad (33)$$

Each of the entities on the right side of the equation are known. The input voltage $V_{IN}$ is sampled and input to the controller as shown in FIG. 1. In addition, the turns ratio N is known and available to the controller. The output voltage $V_{OUT}$ is also known since it the voltage that is desired to be generated at the output.

With reference to FIG. 18, the controller 480 comprises an A/D converter 482, multiplier 484, divider 486, PWM circuit 488, output buffers 490, 492, clock circuitry 494 and sine generator 496. The input voltage $V_{IN}$ is input to the A/D converter 482 that outputs a voltage representative of $V_{IN}$. This signal is input to one of the two input of the multiplier 484. The value N is input to the second input. The multiplier 484 functions to generate the product $NV_{IN}$. The product is input to the one of the two inputs of the divider 486.

Clock circuitry generates the necessary clock signals to drive sine generator 496 which can comprise a read only memory (ROM) containing a digitally sampled sine function. Note that only 90 degrees of sine function data is required. The output of the sine generator represents the output voltage $V_{OUT}$. This is then input to the second input of divider 486. The divider 486 generates the dividend D in accordance with Equation 33 above.

The duty cycle value D is input to a conventional pulse width modulation (PWM) circuit 488 which functions to generate a square wave output signal having a duty cycle D. Two output signals PWM and $\overline{PWM}$ are generated by the PWM circuit. These two signals are buffered by output buffers 490, 492, respectively. The output buffers generate a signal capable of driving a FET switch.

It should be apparent to those skilled in the electrical arts that the controller 480 of FIG. 18 can be realized in many different ways as long as the equation for the duty cycle D is implemented.

Figures 19, 20:
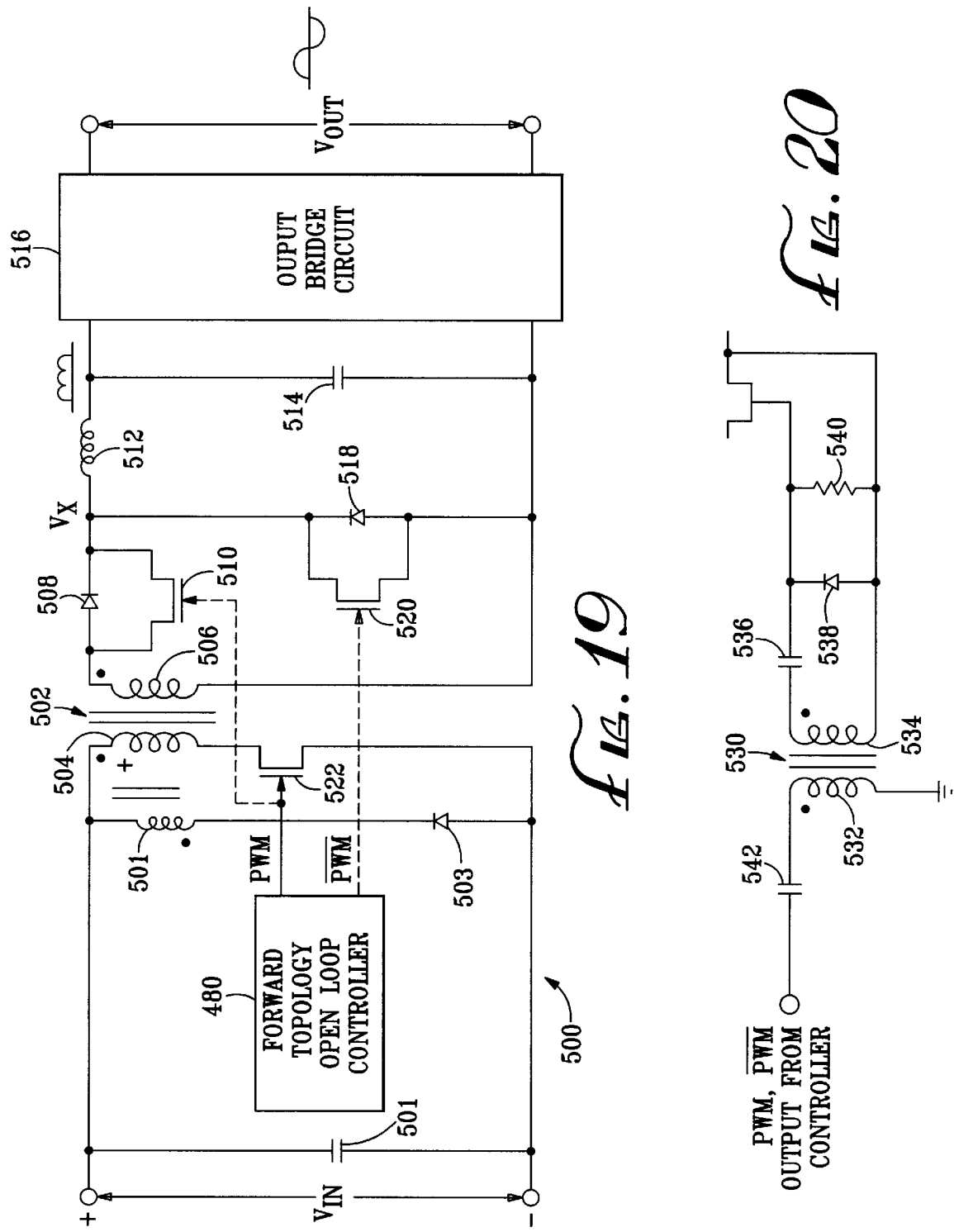
FIG. 19 is a schematic diagram of the fourth embodiment of a ring generator circuit having a forward topology constructed in accordance with the present invention.
FIG. 20 is a schematic diagram of an example of a FET drive isolation circuit.

A schematic diagram of the fourth embodiment of a ring generator circuit having a forward topology constructed in accordance with the present invention is shown in FIG. 19. For clarity, a simplified topology of the forward converter is shown. One skilled in the art, however, could optionally add components to provide additional functionality beyond what is shown.

The forward converter circuit, generally referenced 500, comprises a coil 512, transformer 502, capacitors 501, 514, FETs 522, 510, 520, diode 503, 508 and output bridge circuit 516. The primary characteristics of the controller and corresponding forward converter circuit are (1) that the circuit operates in an open loop fashion as opposed to traditional closed loop design, (2) that the circuit is operative to generate an AC sine wave from a DC input, (3) that the resultant circuit is simple and inexpensive to manufacture and (4) that the resultant control circuit can optionally be realizable in an ASIC.

The controller 480 functions to sample the input voltage $V_{IN}$ and to generate the drive signal for switch (FET) 522. It will be appreciated by those skilled in the art that circuit 500 has an open loop topology with no feedback from the output voltage $V_{OUT}$. The controller 480 generates a pulse width modulated (PWM) signal to switch the FET 522 on and off such that a rectified half sine wave is generated at the input to the output bridge circuit 516. The output bridge circuit 516 functions to generate a full output sine wave from the rectified sine wave input thereto.

The operation of circuit 500 will now be described in more detail. As discussed previously, the circuit functions to generate a half sine wave signal, which the output bridge circuit 516 converts into the full sine wave output signal $V_{OUT}$, in open loop fashion with no sampling of the output signal. This is achieved by utilizing the well known transfer function for a boost converter as shown below in Equation 34. The transfer function of the circuit, in combination with known entities in the circuit, is used to calculate the duty cycle of the switching signal applied to the switch 522. The transfer (or transmission) function relates the output voltage as a function of the duty cycle and input voltage and is expressed below as $$\frac{V_{OUT}}{V_{IN}} = D \cdot N \qquad (34)$$

where $V_{OUT}$=half sine wave output voltage $V_{IN}$=input voltage

N=turns ratio of the transformer

D=duty cycle of the PWM signal input to the switch

Thus, the output voltage $V_{OUT}$ can be expressed as $$V_{OUT} = D \cdot N \cdot V_{IN} \qquad (35)$$

It is important to note that the above Equation 34 for the transfer function is valid only when the current through the inductor 512 is continuous. Thus, during each and every cycle of the circuit, a loop of current must flow through the inductor 512.

Considering the above transfer function, all the entities with the exception of the duty cycle can be determined beforehand. The output voltage $V_{OUT}$ is a known entity, even though it is the voltage that the circuit is generating. The input voltage $V_{IN}$ is also known as it can be periodically sampled. The turns ratio N is also known. The only entity not known or predetermined is the duty cycle D that must be calculated each cycle.

Thus, the controller 480, functions to calculate during each cycle, the duty cycle D which is used to adjust accordingly, the pulse width of the switching signal applied to the gate of the FET 522.

The forward converter 500 is a well known PWM converter topology comprising two stages: a transformer stage and a buck converter stage. At the beginning of the cycle when the FET switch 522 is closed, the voltage across the primary winding 504 of the transformer 502 is $V_{IN}$. At the same time, the voltage across the secondary winding 506 is $NV_{IN}$. Therefore, the diode 508 is forward biased and at $V_X$ the voltage equal to $NV_{IN}$ (without taking $V_{508}$ into consideration).

Disregarding the diode voltage, the voltage applied across the inductor 512 is equal to $VOUT-NV_{IN}$. This causes a linearly increasing current to flow through the inductor and the output capacitor 514 in accordance with the well known equation $$\frac{dI}{dt} = \frac{V}{L} \qquad (36)$$

When the FET switch 522 turns off, i.e., opens, the voltage across the transformer 502 reverses and diode 508 turns off. The voltage $V_X$ point decreases rapidly as the inductor 512 attempts to maintain constant current. The diode 518 turns on and the current through the inductor 512 continues to flow in the same direction. The current path is through diode 518, inductor 512 and capacitor 514.

The inductor 512 continues to dump current into the capacitor 514. At this point in the cycle the voltage applied across the inductor is $V_{OUT}$ (without taking $V_{508}$ into consideration) while the current decreases linearly in accordance with the basic Equation 36 given above. At the beginning of the next cycle the FET switch 522 turns on again and the principal of operating as described above applies.

The winding 501 is a tertiary winding on transformer 502 and functions to discharge the transformer current as explained below. While the FET 522 is on, the primary winding 504 of the transformer charges and the diode 503 is off. When the FET 522 turns off, the voltage across the windings of transformer 502 reverse polarity and diode 503 turns on. Thus, the voltage across winding 501 is limited to the level of $V_{IN}$ and the transformer current finding a path though capacitor 501, diode 503 and winding 501.

Note that the output voltage using this type of topology can be higher or lower then input voltage, depending on the value of N and D. FET switches 510, 522 are on at the same time while FET switch 520 works in a complimentary fashion to FET switch 522. FET 510, 520 functions as a synchronous rectifier using the same principles as $Q_2$ in FIG. 6, i.e., to maintain operation of the circuit in a continuous current mode.

FET Drive Isolation

Techniques can be used to isolate the drive to the FETs of the secondary circuits such as FET 466 (FIG. 17), FETs 510, 520 (FIG. 19), as represented by the dashed lines. One possible isolation technique is to use a pulse transformer to couple the control signal to the FET. A schematic diagram of a FET drive isolation circuit is shown in FIG. 20.

The pulse transformer 530 is used to float the non-inverted or inverted PWM signal from the controller and to transmit it to the FET switches at the secondary. A control signal is input to one end of a capacitor 542. The other end is connected to the primary winding 532 of transformer 530. Capacitor 542 is used to eliminate DC voltage from interfering with normal operation of the pulse transformer 530. Capacitor 536, diode 538 and resistor 540 function as a zero restoration circuit utilized to stabilize the levels of the PWM signal that are input to the FET.

While the invention has been described with respect to a limited number of embodiments, it will be appreciated that many variations, modifications and other applications of the invention may be made. For example, one skilled in the art could adapt the ring generator controller of the present invention to operate with other type of open loop flyback DC to AC converter circuits such as UPSs and AC generators from a battery supply. In addition, the present invention can be used to implement an open loop flyback DC to DC converter by removing the sine generator and output bridge circuitry.

What is claimed is:

1. A controller for controlling a DC to AC open loop pulse width modulation (PWM) converter circuit, said controller comprising:

sampling means for generating a digital number representative of the magnitude of a source of electrical power, denoted by $V_{IN}$;

output voltage generator means for generating a digital representation of a desired output voltage, denoted by $V_{OUT}$;

processing means for determining the duty cycle D of a PWM signal as a function of K, N, $V_{IN}$ and $V_{OUT}$; and pulse width modulation means for generating said PWM signal in response to the duty cycle generated by said processing means.

2. The controller according to claim 1, wherein said sampling means comprises A/D converter means.

3. The controller according to claim 1, wherein said output voltage generator means comprises a sine wave generator.

4. The controller according to claim 1, wherein said input voltage $V_{IN}$ is an unregulated DC voltage.

5. The controller according to claim 1, wherein said processing means is operative to determine the duty cycle of a PWM signal adapted for use with an open loop converter having a buck topology, said processing means comprising a divider for dividing $V_{OUT}$ by $V_{IN}$.

6. The controller according to claim 1, wherein said processing means is operative to determine the duty cycle of a PWM signal adapted for use with an open loop converter having a boost topology, said processing means comprising:
 a summer for generating the sum $V_{OUT}-V_{IN}$; and
 a divider for dividing $V_{OUT}$ by said sum.

7. The controller according to claim 1, wherein said processing means is operative to determine the duty cycle of a PWM signal adapted for use with an open loop converter having a forward topology, said processing means comprising:
 a multiplier for generating the product $N \cdot V_{IN}$; and
 a divider for dividing $V_{OUT}$ by said product.

8. The controller according to claim 1, further comprising bridge control means for generating a bridge control signal for converting a half wave sine function to a fill wave sine function, said bridge control signal having the same frequency as the sine wave output by said circuit.

9. The controller according to claim 1, further comprising buffer means coupled to the output of said pulse width modulation means, said buffer means for generating an output PWM signal with suitable drive and load characteristics.

10. A controller for controlling an open loop pulse width modulation (PWM) converter circuit having a buck topology, said circuit connected to a source of electrical power, said controller comprising:
 sampling means for generating a digital representation of the voltage level of said source of electrical power denoted by $V_{IN}$;
 sine generator means for generating a digital representation of a sinusoidal waveform denoted by $V_{OUT}$;
 processing means for determining the duty cycle of a PWM signal in accordance with the following equation $$D = \frac{V_{OUT}}{V_{IN}}$$

wherein
 D=duty cycle of PWM signal
 $V_{IN}$=voltage level of said source of DC electrical power
 $V_{OUT}$=digital representation of a sinusoidal waveform;
 pulse width modulation means for generating said PWM signal in response to the duty cycle generated by said processing means, said PWM signal output by said controller;
 circuitry for generating a half wave sine wave in accordance with said PWM signal; and output bridge circuitry for converting said half wave sine wave signal into a full wave sine function.

11. The controller according to claim 10, wherein said sampling means comprises A/D converter means.

12. The controller according to claim 10, wherein said sine generator means comprises counting means coupled to look up table means.

13. The controller according to claim 10, wherein said sine generator means comprises synchronous state machine means.

14. The controller according to claim 10, further comprising buffer means coupled to the output of said pulse width modulation means, said buffer means for generating an output PWM signal with suitable drive and load characteristics.

15. The controller according to claim 10, wherein said processing means is operative to determine the duty cycle of a PWM signal adapted for use with an open loop converter having a buck topology, said processing means comprising a divider for dividing $V_{OUT}$ by $V_{IN}$.

16. A controller for controlling an open loop converter circuit having a boost topology, said circuit connected to a source of electrical power, said controller comprising:
 sampling means for generating a digital representation of the voltage level of said source of electrical power denoted by $V_{IN}$;
 sine generator means for generating a digital representation of a sinusoidal waveform denoted by $V_{OUT}$;
 processing means for determining the duty cycle of a pulse width modulated (PWM) signal in accordance with the following equation $$D = \frac{V_{OUT} - V_{IN}}{V_{OUT}}$$

wherein
 D=duty cycle of PWM signal
 $V_{IN}$=voltage level of said source of DC electrical power
 $V_{OUT}$=digital representation of a sinusoidal waveform;
 pulse width modulation means for generating said PWM signal in response to the duty cycle generated by said processing means, said PWM signal output by said controller;
 circuitry for generating a half wave sine wave in accordance with said PWM signal; and
 output bridge circuitry for converting said half wave sine wave signal into a full wave sine function.

17. The controller according to claim 16, wherein said sampling means comprises A/D converter means.

18. The controller according to claim 16, wherein said sine generator means comprises counting means coupled to look up table means.

19. The controller according to claim 16, wherein said sine generator means comprises synchronous state machine means.

20. The controller according to claim 16, further comprising buffer means coupled to the output of said pulse width modulation means, said buffer means for generating an output PWM signal with suitable drive and load characteristics.

21. The controller according to claim 16, wherein said processing means is operative to determine the duty cycle of a PWM signal adapted for use with an open loop converter having a boost topology, said processing means comprising:
 a summer for generating the sum $V_{OUT}-V_{IN}$; and a divider for dividing $V_{OUT}$ by said sum.

22. A controller for controlling an open loop converter circuit having a forward topology, said circuit connected to a source of electrical power and including a transformer having a primary and a secondary, said controller comprising:

sampling means for generating a digital representation of the voltage level of said source of electrical power denoted by $V_{IN}$;

sine generator means for generating a digital representation of a sinusoidal waveform denoted by $V_{OUT}$;

processing means for determining the duty cycle of a pulse width modulated (PWM) signal in accordance with the following equation $$D = \frac{V_{OUT}}{N \cdot V_{IN}}$$

wherein

D=duty cycle of PWM signal
N=turns ratio of said transformer
$V_{IN}$=voltage level of said source of DC electrical power
$V_{OUT}$=digital representation of a sinusoidal waveform;

pulse width modulation means for generating said PWM signal in response to the duty cycle generated by said processing means, said PWM signal output by said controller;

circuitry for generating a half wave sine wave in accordance with said PWM signal; and output bridge circuitry for converting said half wave sine wave signal into a full wave sine function.

23. The controller according to claim 22, wherein said sampling means comprises A/D converter means.

24. The controller according to claim 22, wherein said sine generator means comprises counting means coupled to look up table means.

25. The controller according to claim 22, wherein said sine generator means comprises synchronous state machine means.

26. The controller according to claim 22, further comprising buffer means coupled to the output of said pulse width modulation means, said buffer means for generating an output PWM signal with suitable drive and load characteristics.

27. The controller according to claim 22, wherein said processing means is operative to determine the duty cycle of a PWM signal adapted for use with an open loop converter having a forward topology, said processing means comprising:

a multiplier for generating the product $N \cdot V_{IN}$; and
a divider for dividing $V_{OUT}$ by said product.

28. A method of controlling an open loop pulse width modulation (PWM) converter circuit, said method comprising the steps of:

generating a digital number representative of the magnitude of a source of DC electrical power denoted by $V_{IN}$;

generating a digital representation of a sinusoidal waveform denoted by $V_{OUT}$;

determining the duty cycle of a PWM signal; and
generating said PWM signal in response to the duty cycle generated by said processing means.

29. The method according to claim 28, wherein the step of determining the duty cycle of said PWM signal adapted for use with an open loop converter having a buck topology comprises the step of dividing $V_{OUT}$ by $V_{IN}$.

30. The method according to claim 28, wherein the step of determining the duty cycle of a PWM signal adapted for use with an open loop converter having a boost topology comprises the steps of:

generating the sum $V_{OUT}-V_{IN}$; and
dividing $V_{OUT}$ by said sum.

31. The method according to claim 28, wherein the step of determining the duty cycle of a PWM signal adapted for use with an open loop converter having a forward topology comprises the steps of:

generating the product $N \cdot V_{IN}$; and
dividing $V_{OUT}$ by said product.

32. The method according to claim 28, further comprising the step converting a half wave sine function to a full wave sine function.

33. The method according to claim 28, further comprising the step of generating an output PWM signal with suitable drive and load characteristics.

34. A method of controlling an open loop pulse width modulation (PWM) converter circuit having a buck topology, said circuit connected to a source of electrical power, said method comprising the steps of:

generating a digital representation of the voltage level of said source of electrical power denoted by $V_{IN}$;

generating a digital representation of a sinusoidal waveform denoted by $V_{OUT}$;

determining the duty cycle of a PWM signal in accordance with the following equation $$D = \frac{V_{OUT}}{V_{IN}}$$

wherein

D=duty cycle of PWM signal
$V_{IN}$=voltage level of said source of DC electrical power
$V_{OUT}$=digital representation of a sinusoidal waveform;

generating said PWM signal in response to the duty cycle generated in said step of determining;

generating a half wave sine wave in accordance with said PWM signal; and converting said half wave sine wave signal into a full wave sine function.

35. A method of controlling an open loop converter circuit having a boost topology, said circuit connected to a source of electrical power, said method comprising the steps of:

generating a digital representation of the voltage level of said source of electrical power denoted by $V_{IN}$;

generating a digital representation of a sinusoidal waveform denoted by $V_{OUT}$;

determining the duty cycle of a pulse width modulated (PWM) signal in accordance with the following equation $$D = \frac{V_{OUT} - V_{IN}}{V_{OUT}}$$

wherein

D=duty cycle of PWM signal
$V_{IN}$=voltage level of said source of DC electrical power
$V_{OUT}$=digital representation of a sinusoidal waveform;

generating said PWM signal in response to the duty cycle generated in said step of determining;

generating a half wave sine wave in accordance with said PWM signal; and output bridge circuitry for converting said half wave sine wave signal into a full wave sine function.

36. A method of controlling an open loop pulse width modulation (PWM) converter circuit having a forward topology, said circuit connected to a source of electrical power and including a transformer having a primary and a secondary, said method comprising the steps of:

generating a digital representation of the voltage level of said source of electrical power denoted by $V_{IN}$;

generating a digital representation of a sinusoidal waveform denoted by $V_{OUT}$;

determining the duty cycle of a PWM signal in accordance with the following equation $$D = \frac{V_{OUT}}{N \cdot V_{IN}}$$

wherein
 D=duty cycle of PWM signal
 N=turns ratio of said transformer
 $V_{IN}$=voltage level of said source of DC electrical power
 $V_{OUT}$=digital representation of a sinusoidal waveform;
 generating said PWM signal in response to the duty cycle generated in said step of determining;
 generating a half wave sine wave in accordance with said PWM signal; and
 converting said half wave sine wave signal into a fill wave sine function.

* * * * *